(12) United States Patent
Bonanno et al.

(10) Patent No.: US 11,556,474 B1
(45) Date of Patent: Jan. 17, 2023

(54) INTEGRATED SEMI-INCLUSIVE HIERARCHICAL METADATA PREDICTOR

(71) Applicant: International Business Machines Corporation, Armonk, NY (US)

(72) Inventors: James Bonanno, Liberty Hill, TX (US); Adam Benjamin Collura, Hopewell Junction, NY (US); Edward Thomas Malley, Eastchester, NY (US); Brian Robert Prasky, Campbell Hall, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/406,438

(22) Filed: Aug. 19, 2021

(51) Int. Cl.
*G06F 12/0855* (2016.01)
*G06F 12/0897* (2016.01)
*G06F 9/38* (2018.01)

(52) U.S. Cl.
CPC ........ *G06F 12/0855* (2013.01); *G06F 9/3842* (2013.01); *G06F 12/0897* (2013.01); *G06F 2212/466* (2013.01); *G06F 2212/6032* (2013.04)

(58) Field of Classification Search
None
See application file for complete search history.

(56) References Cited

U.S. PATENT DOCUMENTS

| | | | |
|---|---|---|---|
| 9,280,351 B2 | 3/2016 | Bonanno et al. | |
| 9,298,465 B2 | 3/2016 | Bonanno et al. | |
| 9,411,598 B2 | 8/2016 | Bonanno et al. | |
| 10,394,559 B2 | 8/2019 | Bonanno et al. | |
| 10,481,912 B2 | 11/2019 | Bonanno et al. | |
| 10,754,781 B2 | 8/2020 | Bonanno et al. | |
| 10,908,784 B2 | 2/2021 | Boucher et al. | |
| 10,983,670 B2 | 4/2021 | Boucher et al. | |
| 2011/0202727 A1* | 8/2011 | Speier | G06F 12/128 |
| | | | 711/E12.024 |
| 2017/0371790 A1* | 12/2017 | Dwiel | G06F 12/0862 |
| 2019/0114263 A1* | 4/2019 | Olorode | G06F 12/0875 |
| 2019/0179300 A1 | 6/2019 | Cella et al. | |
| 2020/0257534 A1 | 8/2020 | Bonanno et al. | |
| 2021/0049239 A1 | 2/2021 | Li et al. | |

OTHER PUBLICATIONS

Anonymous, "Minimizing the costly update of persistant meta-data in multi-teir enviroment by using metadata fileter"; ip.com; IPCOM000244214D; Nov. 24, 2015; 9p.

(Continued)

*Primary Examiner* — Charles J Choi

(74) *Attorney, Agent, or Firm* — Cantor Colburn LLP; Jeffrey Ingalls

(57) ABSTRACT

Embodiments are provided for an integrated semi-inclusive hierarchical metadata predictor. A hit in a second-level structure is determined, the hit being associated with a line of metadata in the second-level structure. Responsive to determining that a victim line of metadata in a first-level structure meets at least one condition, the victim line of metadata is stored in the second-level structure. The line of metadata from the second-level structure is stored in a first-level structure to be utilized to facilitate performance of a processor, the line of metadata from the second-level structure including entries for a plurality of instructions.

17 Claims, 21 Drawing Sheets

(56) References Cited

OTHER PUBLICATIONS

Anonymous; "System and Method for Metadata enrichment for Search system via presence server and mail service"; ip.com IPCOM000185259D; Jul. 17, 2009; 9p.

Anonymously; "Graph Aware Caching Policy for Distributed Graph Stores"; IPCOM000240727D; ip.com Feb. 23, 2015; 6 pages.

Anonymously; "Machine-Learned Caching of Datasets"; ip.com IPCOM000252027D; Dec. 14, 2017; 38 p.

Anoymous; "A System and Method for Providing Meta-Data Model Based Distributed Data Validation"; ip.com IPCOM000214707D; Feb. 3, 2021; 8p.

Brown; "Fast Thread Migration via CacheWorking Set Prediction"; Proceedings of the 17th International Symposium on High Performance Computer Architecture HPCA; 2011; 12p.

Burcea; "Predictor Virtualization"; ASPLOS'08 Mar. 1-5, 2008; ACM; 11 p.

Collura; "Using Metadata Presence Information to Determine When to Access a Higher-Level Metadata Table", U.S. Appl. No. 17/406,452, filed Aug. 19, 2021.

Elbert; "Predictive Caching of Video Content in 5G Networks Based on Motion and Content Consumption Analysis"; ip.com IPCOM000250951D; Sep. 18, 2017; 6p.

Huang; "A Hierarchical Location Prediction Neural Network for Twitter User Geolocation"; Proceedings of the 2019 Conference on Empirical Methods in Natural Language Processing and the 9th International Joint Conference on Natural Language Processing, pp. 4732-4742, Hong Kong, China, Nov. 3-7, 2019; 11 p.

List of IBM Patents or Patent Applications Treated as Related; Date Filed: Aug. 19, 2021, 2 pages.

Lu."Extending the Lifetime of Flash-based Storage through Reducing Write Amplification from File Systems"; 1th USENIX Conference on File and Storage Technologies (FAST '13), 2013; 14p.

Mohammed; "Meta-data and Data Mart solutions for better understanding for data and information in E-government Monitoring"; IJCSI International Journal of Computer Science Issues, vol. 9, Issue 6, No. 3, Nov. 2012; 6p.

Shi. "A Hierarchical Neural Model of Data Prefetching"; ASPLOS '21, Apr. 19-23, 2021, Virtual; 13p.

Woodley; "Crosswalks, Metadata Harvesting, Federated Searching, Metasearching: Using Metadata to Connect Users and Information"; Introduction to Metadata 3.0 © 2008 J. Paul Getty Trust; Crosswalks, Metadata Harvesting, Federated Searching, Metasearching; 2008; 25p.

\* cited by examiner

FIG. 10

| cycle -> | 0 | 1 | 2 | 3 | 4 | 5 | 6 | 7 | 8 | 9 | 10 |
|---|---|---|---|---|---|---|---|---|---|---|---|
| index pipeline -> | b0 index BTB1 | b1 array access | b1+1 array out | b1+2 hit detect | b1+3 need BTB2? | b1+4 | | | | | |
| speculative BTB2 access | | u-1 | u0 index BTB2 | u1 array access | u2 array access | u3 array output cancel? | u4 demand xfer | u5 | u6 preload xfer | u7 | u8 |
| demand hit detect | | | | | | | | reformat, hit detect | write BTB1 write LOB | | |
| preload hit detect | | | | | | | | | | reformat, hit detect | write BTB1 write LOB |
| demand victim | | | | b1+2 stage | b1+3 stage | re-format | hold | hold | victim write BTB2 | | |
| preload victim | | | | | | b0 u3 triggers BTB1 index | b1 array access | b1+1 array output | b1+2 re-format | b1+3 stage | b1+4 victim write BTB2 |
| resume index pipeline | | | | | | | | b0 | b1 u6->b1 bypass | b1+1 | b1+2 |
| resume prediction pipeline | | | | | | | | | | b2 | b3 |
| sequential index pipeline | | | | | | | | | | b0 | b1 u8->b1 bypass if needed |

FIG. 11

| cycle -> | 3 | 4 | 5 | 6 | 7 | 8 | 9 | 10 | 11 | 12 | 13 |
|---|---|---|---|---|---|---|---|---|---|---|---|
| index pipeline -> | b1+2 hit detect | b1+3 need BTB2? | b1+4 | | | | | | | | |
| speculative BTB2 access | | u-1 | u0 index BTB2 | u1 array access | u2 array access | u3 array output | u4 demand xfer | u5 | u6 preload xfer | u7 | u8 |
| demand hit detect | | | | | | | | reformat, hit detect | write BTB1 write LOB | | |
| preload hit detect | | | re-format | | | | | | | reformat, hit detect | write BTB1 write LOB |
| demand victim | b1+2 stage | b1+3 stage | | hold | hold | hold | hold | hold | victim write BTB2 | | |
| preload victim | | | | | | b0 u3 triggers BTB1 index | b1 array access | b1+1 array output | b1+2 re-format | b1+3 stage | b1+4 victim write BTB2 |
| resume index pipeline | | | | | | | | b0 | b1 u6->b1 bypass | b1+1 | b1+2 |
| resume prediction pipeline | | | | | | | | | | b2 | b3 |
| sequential index pipeline | | | | | | | | | | b0 | b1 u8->b1 bypass if needed |

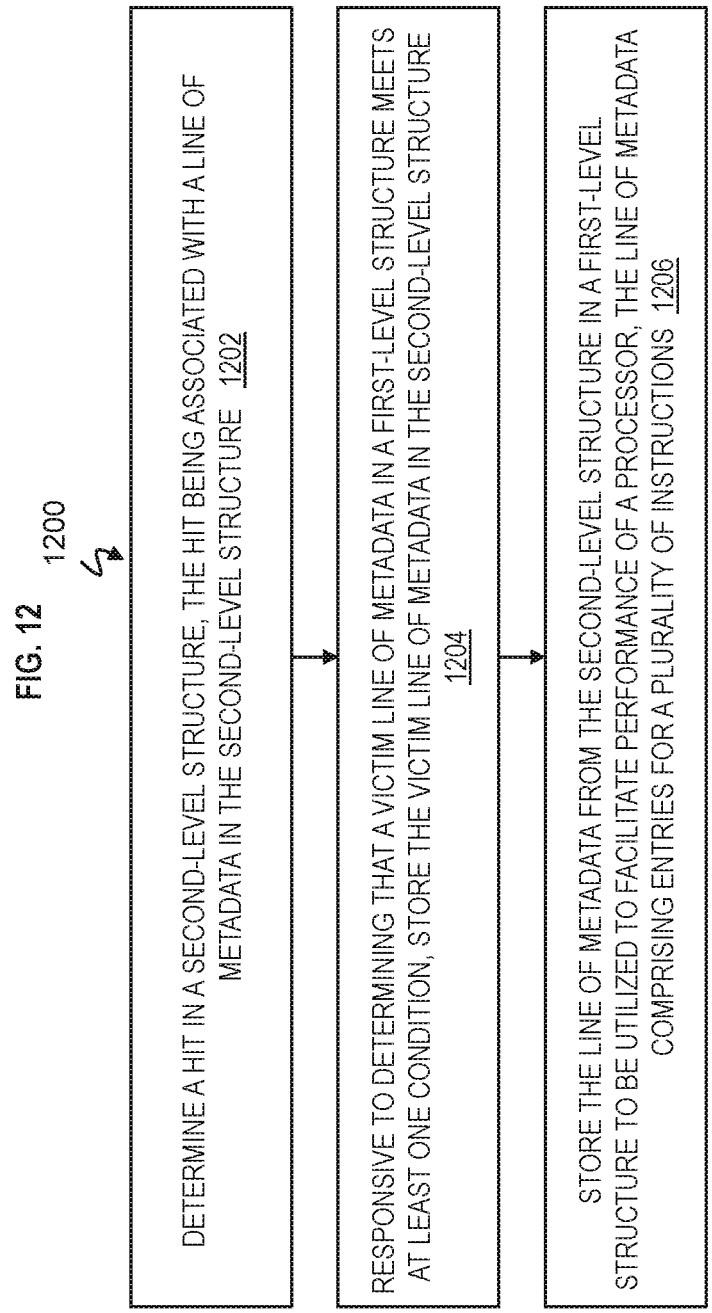

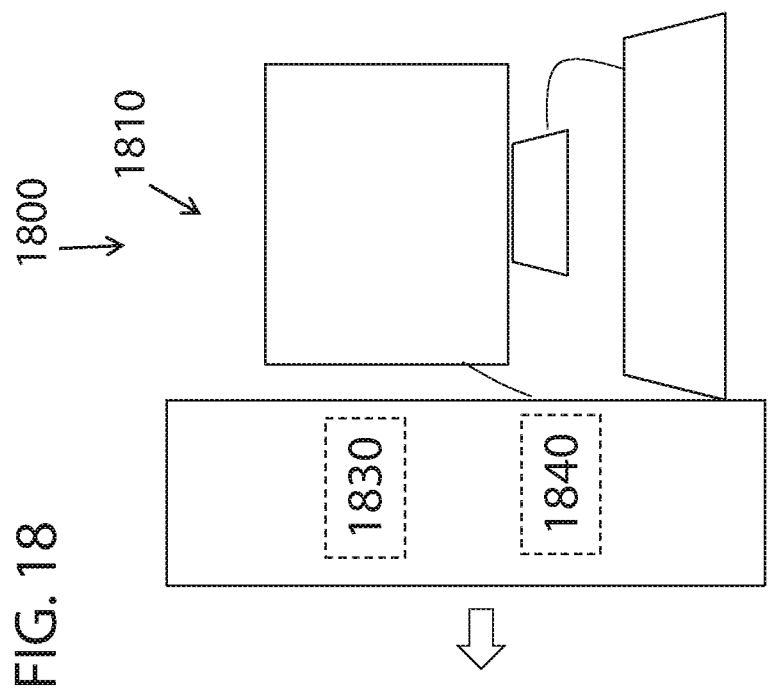
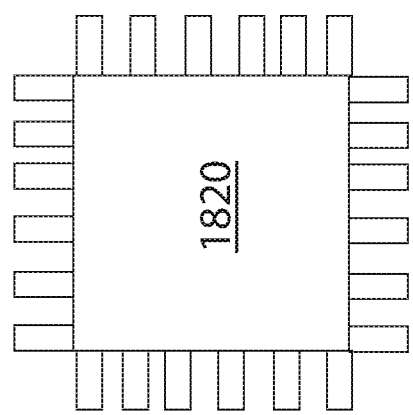
FIG. 18

INTEGRATED SEMI-INCLUSIVE HIERARCHICAL METADATA PREDICTOR

BACKGROUND

The present invention generally relates to computer systems, and more specifically, to computer-implemented methods, computer systems, and computer program products configured and arranged for providing an integrated semi-inclusive hierarchical metadata predictor.

A pipeline microprocessor has a path, channel, or pipeline that is divided into stages that perform specific tasks. Each of the specific tasks is part of an overall operation that is directed by a programmed instruction. Each of the programmed instructions or macro instructions in a software application program is executed in sequence by the microprocessor. As a programmed instruction enters the first stage of the pipeline, certain tasks are accomplished. The instruction is then passed to subsequent stages for accomplishment of subsequent tasks. Following completion of a final task, the instruction completes execution and exits the pipeline. Aspects of execution of programmed instructions by a pipeline microprocessor are analogous to the manufacture of items on an assembly line. One of the aspects of any assembly line is that there are multiple items resident in the line in successive stages of assembly during any given point in time. The same is true for a pipeline microprocessor. During any cycle of a pipeline clock signal, there are multiple instructions present in the various stages, with each of the instructions being at successive levels of completion. Therefore, microprocessors allow overlapping execution of multiple instructions with the same circuitry. The circuitry is usually divided up into stages and each stage processes a specific part of one instruction at a time, passing the partial results to the next stage.

Instructions may be branches, and processors attempt to predict the outcome of the branch to speed up processing. Branch prediction is a type of metadata prediction, predicting information about the behavior or characteristics of instructions and acting on those predictions to improve performance. Although existing processors have been suitable for their intended purposes, what is needed are systems and methods having certain features of embodiments of the present invention.

SUMMARY

Embodiments of the present invention are directed to computer-implemented methods for an integrated semi-inclusive hierarchical metadata predictor. A non-limiting example computer-implemented method includes determining a hit in a second-level structure, the hit being associated with a line of metadata in the second-level structure. The computer-implemented method includes responsive to determining that a victim line of metadata in a first-level structure meets at least one condition, storing the victim line of metadata in the second-level structure. The computer-implemented method includes storing the line of metadata from the second-level structure in a first-level structure to be utilized to facilitate performance of a processor, the line of metadata from the second-level structure comprising entries for a plurality of instructions.

This can provide an improvement over known methods for a metadata predictor by ensuring that updated content from a first-level structure is always written into a second-level structure, doing so upon eviction of the content from the first-level structure.

In addition to one or more of the features described above or below, or as an alternative, in further embodiments of the invention the at least one condition comprises an indication that the victim line of metadata has been updated. Thus, advantageously tracking and knowing which lines of metadata have been updated in the first-level structure are provided.

In addition to one or more of the features described above or below, or as an alternative, in further embodiments of the invention the at least one condition comprises an indication that the victim line of metadata is absent from the second-level structure. Thus, advantageously tracking and knowing which lines of metadata in the first-level structure are absent from the second-level structure are provided.

In addition to one or more of the features described above or below, or as an alternative, in further embodiments of the invention the line of metadata from the second-level structure is provided to a prediction pipeline to make metadata predictions. Thus, advantageously providing direct integration of the line of metadata, brought from the second-level structure, into the prediction logic of the prediction pipeline.

In addition to one or more of the features described above or below, or as an alternative, in further embodiments of the invention the second-level structure is configured to be searched for a preload line of metadata associated with a preload victim line of metadata, the first-level structure being searched to provide the preload victim line of metadata; the preload line of metadata is written into the first-level structure; and the preload line of metadata is provided to a prediction pipeline, responsive to being requested. Thus, in addition to providing the line of metadata, advantageously providing the preload line of metadata from the second-level structure and explicitly reading the first-level structure for the corresponding victim.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 10 depicts a block diagram of a pipeline illustration using a speculative search to access a second-level structure in accordance with one or more embodiments of the present invention;

FIG. 11 depicts a block diagram of a pipeline illustration using a nonspeculative search to access a second-level structure in accordance with one or more embodiments of the present invention;

FIG. 12 is a flowchart of a computer-implemented method for an integrated semi-inclusive hierarchical metadata predictor in accordance with one or more embodiments of the invention;

FIG. 18 is a block diagram of a system to design/layout a metadata predictor in accordance with one or more embodiments of the present invention;

DETAILED DESCRIPTION

Figure 1:
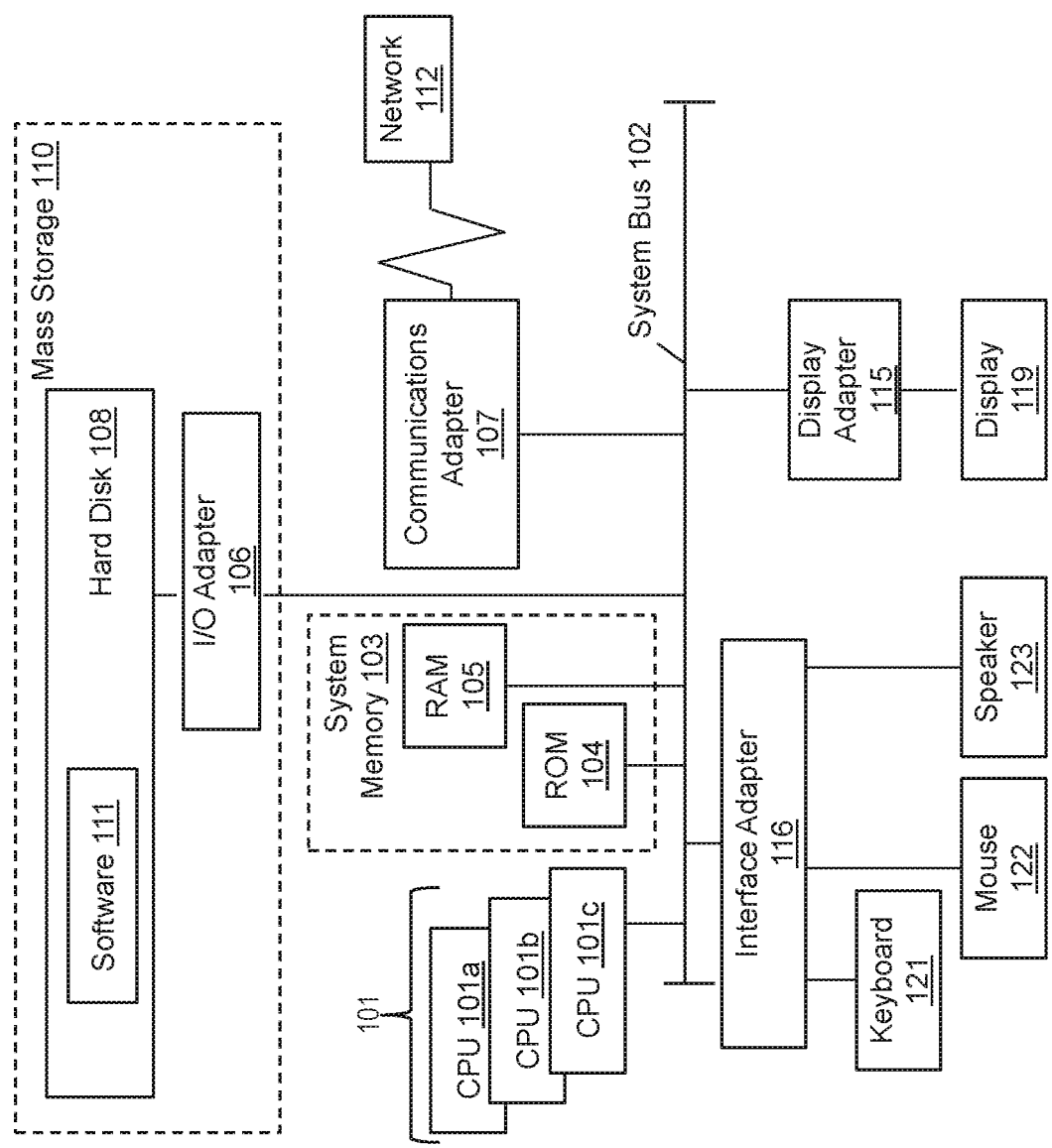
FIG. 1 depicts a block diagram of an example computer system for use in conjunction with one or more embodiments of the present invention.

One or more embodiments of the present invention provide computer-implemented methods, computer systems, and computer program products arranged and configured for providing an integrated semi-inclusive hierarchical metadata predictor. One or more embodiments provide a direct integration of a hierarchical metadata predictor which is enabled by line-based rather than branch-based organization of the branch target buffer (BTB) which is a memory structure, for example, an array. There are two memory structures (i.e., two BTBs) in the hierarchical metadata predictor, which are the first-level structure, for example, BTB1 and the larger second-level structure, for example, BTB2. According to one or more embodiments, the hierarchical metadata predictor is configured to be semi-inclusive by tracking the change status of a line in the first-level structure and whether that line is present (e.g., BTB2 presence) in the second-level structure, and upon installing entries into the first-level structure (e.g., BTB1), the hierarchical metadata predictor is configured to write changed victims (lines) into the second-level structure (e.g., BTB2). The second-level structure (e.g., BTB2) can return demand line data and preload line data which is performed by explicitly reading preload victims from the first-level structure (e.g., BTB1) while accessing the second-level structure (e.g., BTB2). In a parent-based system, BTB2 can be partitioned to be dedicated with certain BTB1 parent(s).

A metadata predictor is a system that uses metadata to predict information about instructions and/or data in a microprocessor. Load instructions being dependent on store instructions is an example of a type of information that can be predicted in a metadata predictor. A line prefetch predictor is another example. Branch prediction is yet another type of metadata prediction that is a performance-critical component of a pipelined high frequency microprocessor. Branch prediction is used to predict the direction (e.g., taken versus not taken) and the target address of branch instructions. This is beneficial because it allows processing to continue along a branch's predicted path rather than having to wait for the outcome of the branch to be determined. A penalty is incurred only if a branch is mis-predicted.

A branch target buffer (BTB) is a structure that stores branch and target address information. Other structures, such as a branch history table (BHT), pattern history table (PHT), and multiple target table (MTT), can be included to store additional information used for branch direction and target prediction. The BTB can be searched in parallel to and independently from instruction fetching to find upcoming branches, in which case BTB is utilized for lookahead branch prediction, which is called asynchronous branch prediction. Additionally, the BTB can be accessed simultaneously with and/or after fetching instructions and used to determine instruction boundaries in order to provide a prediction for each encountered branch instruction, in which case it is called synchronous branch prediction. In either case, the performance benefit of the BTB is a function of the accuracy of the prediction provided from the BTB and the latency required to access the BTB.

A metadata prediction cache can capture metadata predictor output and reuse metadata predictor output while staying in the same section of code to repeatedly make predictions. Metadata predictors can be organized to have a variable line size with a parent-based design. A multi-level hierarchy of metadata predictors is possible. This is analogous to a multilevel instruction or data cache hierarchy. The first level of a two-level hierarchy would be smaller and faster to access than the second level which would be larger and slower. The design of a metadata predictor hierarchy is more flexible than that of an instruction or data cache hierarchy. This is because metadata is not required to be present and accurate for proper function of the processor unlike other caches. One or more embodiments address the problem of how to incorporate a hierarchical metadata predictor into a system that includes a line-based metadata prediction cache and is optionally parent-based. According to one or more embodiments, the hierarchy may be managed by a semi-inclusive manager. Upon writing new entries in the first-level structure, victims (which are lines of metadata being evicted/removed from the first-level structure, for example, to clear space) are written into the second-level structure if the victims are not already present/there and/or if the second-level structure does not have the updated content (of the victim) that occurred in the first-level structure. The second-level structure of the hierarchy can return both demand line data and preload line data. Using page mode is one example way to provide this preload capability. Distributed multiplexing/muxing can be employed to allow an efficient wiring implementation. In parent-based systems, the second-level structure can be partitioned to be dedicated to certain first-level parents.

Various terms may be utilized herein:

LIB is the line index buffer. LOB is the line output buffer. BTB is the branch target buffer. IL is the intraline branch which is a branch whose target is in the same line of instruction text (itext). DGT refers to dynamically guessed taken branch. Exit branch refers to a branch that takes the flow from line X to some other line. Entry point is the instruction address (IA) where the metadata predictor starts searching after finding an exit branch, thereby effectively being the exit branch's target instruction address. Taken branch offset is the number of lines between the entry point and the exit branch. SKOOT denotes the Skip Over Offset, which indicates a number of lines after an entry point that contain no branches, and thus need not be searched.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
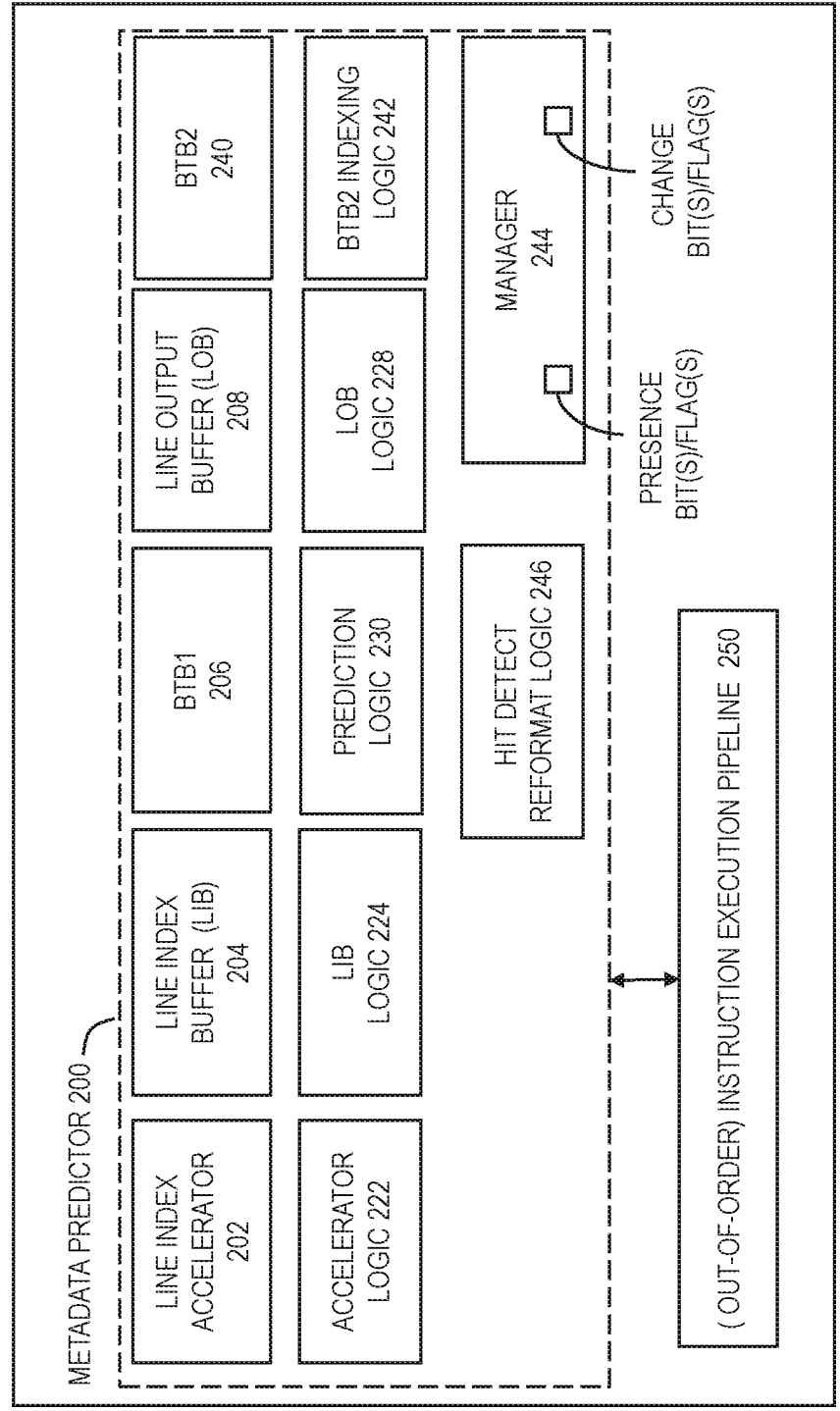
FIG. 2 depicts a block diagram of a metadata predictor in a processor in accordance with one or more embodiments of the present invention.

FIG. 2 is a block diagram of an integrated semi-inclusive hierarchical metadata predictor 200 in processor 101 according to one or more embodiments of the inventions. Processor 101 could be representative of any of the processors 101 discussed in computer system 100 in FIG. 1. Metadata predictor 200 is outside of and runs asynchronously to an instruction execution pipeline 250. Instruction execution pipeline 250 can be an out-of-order pipeline and includes modules/blocks to operate as part of the processor core as understood by one of ordinary skill in the art. Metadata predictor 200 is configured to communicate with (e.g., send and receive data) from instruction execution pipeline 250. Instruction execution pipeline 250 can be any instruction pipeline. In an example instruction execution pipeline 250, of the several units that comprise the processor core, branch prediction logic has the responsibility of the instruction fetch and branch prediction in an instruction fetch and branch prediction unit (IFB). The IFB is the core's navigator, arbitrating all pipeline restart points for both threads. Furthermore, the IFB guides the instruction cache and merge (ICM) unit, is responsible for fetching instruction text from the level 1 instruction cache, and is responsible for attempting to ensure that only the instruction text on what it believes the correct speculative code path is delivered to the instruction decode and dispatch unit (IDU). The pipeline then dispatches to the instruction sequence unit (ISU) which maintains the out-of-order execution pipeline. Instruction issue queues are used to execute instructions in fixed-point units (FXU), vector and floating point units (VFU), load-store units (LSU), etc. Address translation is performed by the translator unit (XU), and checkpointing is managed by the recovery unit (RU). Once an instruction is decoded to be a branch, the dynamically predicted information of that branch if provided overrides any instruction text based static guess that the IDU would otherwise apply.

Metadata predictor 200 includes various hardware components including line index accelerator 202, line index buffer (LIB) 204, branch target buffer (BTB1) 206, line output buffer (LOB) 208, accelerator logic 222, LIB logic 224, LOB logic 228, prediction logic 230, BTB2 240 (which is larger than BTB1 and can supply metadata to BTB1), BTB2 indexing logic 242, semi-inclusive manager 244, and hit detection and reformatting logic 246; the hardware components include caches, combinational logic, memory, etc. Further, the various hardware components of metadata predictor 200 may include firmware (as computer-executable instructions) executed on microcontrollers, along with hardware modules, as special-purpose hardware (e.g., application specific hardware, application specific integrated circuits (ASICs), as embedded controllers, hardwired circuitry, etc.), and/or as some combination or combinations of these. In examples, the modules described herein can be a combination of hardware and programming. The programming can be processor executable instructions stored on a tangible memory, and the hardware can include processing circuitry for executing those instructions. Alternatively or additionally, the modules can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. Further, the modules of metadata predictor 200 can include various digital logic circuits to function as discussed herein.

Figure 3:
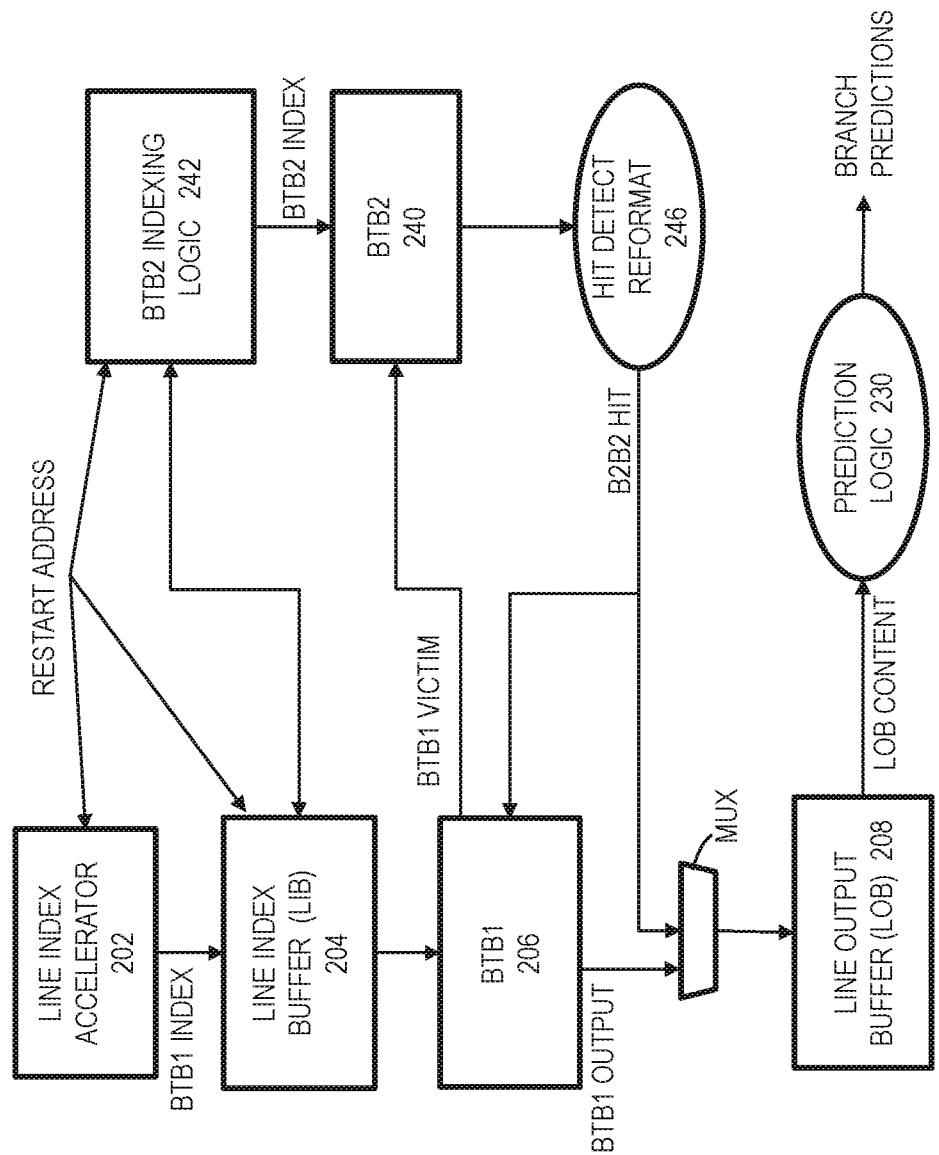
FIG. 3 depicts a block diagram a metadata predictor with a metadata prediction cache in accordance with one or more embodiments of the present invention.
Figure 4:
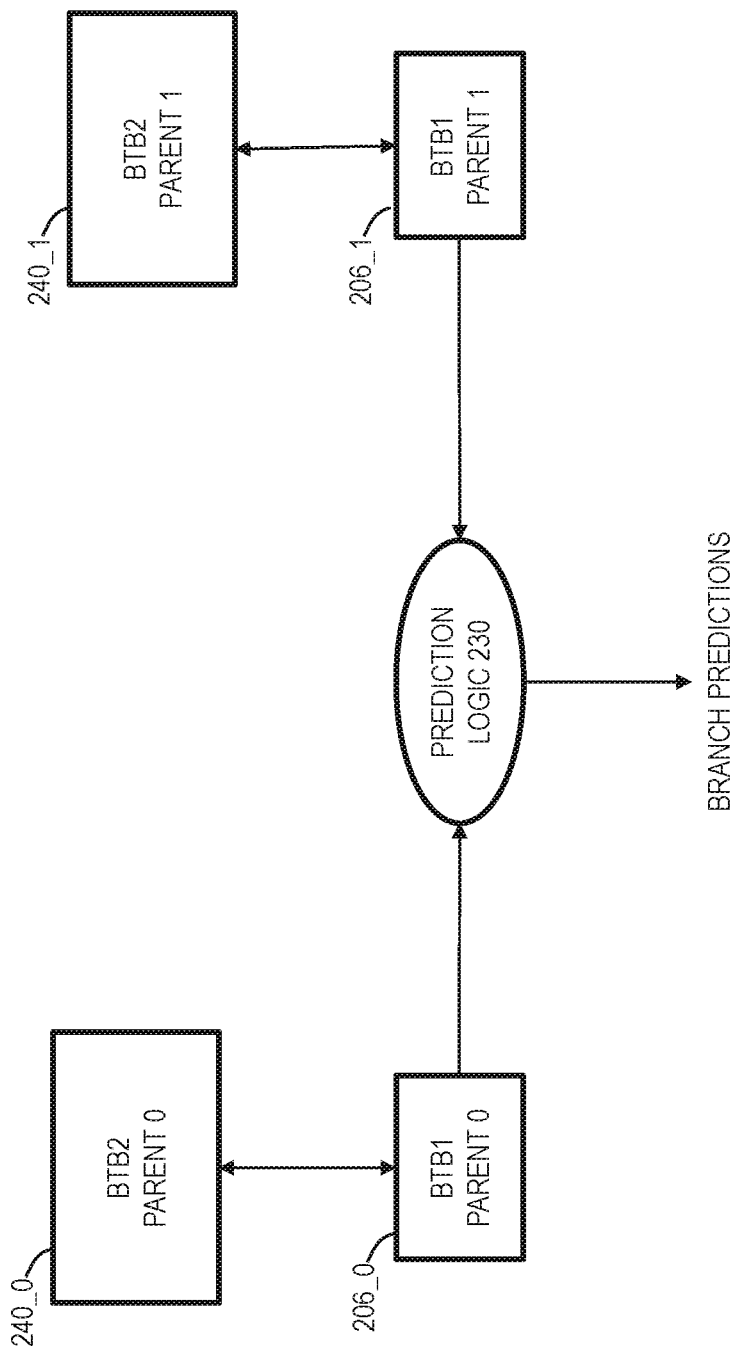
FIG. 4 depicts a block diagram of a metadata predictor in a parent-based design in accordance with one or more embodiments of the present invention.

FIG. 3 is a block diagram of integrated semi-inclusive hierarchical metadata predictor 200 with a prediction cache in accordance with one or more embodiments of the present invention. FIG. 4 is a block diagram of integrated semi-inclusive hierarchical metadata predictor 200 with a prediction cache parent-based design in accordance with one or more embodiments of the present invention. BTB1 206 can be broken into quadrants for use, for example, four quadrants. Similarly, BTB2 240 can be broken into quadrants each of which being dedicated to a quadrant in BTB1 206. More particularly, BTB1 206 is operated as multiple sections in the parent-based design of FIG. 4, although BTB1 206 is a single memory structure. In FIG. 4, BTB1 206 is represented by two quadrants which depict BTB1 206 utilized as BTB1 206_0 and 206_1 for parent 0 and 1, respectively. Accordingly, BTB2 240 is represented by two quadrants which depict BTB2 240 utilized as BTB2 240_0 and 240_1 for parents 0 and 1, respectively. Each quadrant can have its own LOB 208 (not shown in FIG. 4) between the BTB1 and prediction logic 230 in the parent-based design of FIG. 4. Multiplexers (not shown in FIG. 4) may be utilized to provide the appropriate line of metadata to prediction logic 230 based on a predetermined manner of selection.

In FIGS. 3 and 4, BTB1 206 is read out on a line basis, and output is written into a prediction cache, such as LOB 208, to be reused while staying within that line. An index pipeline (e.g., index pipeline 552 depicted in FIG. 5) is configured for reading BTB1 206 and sending output into LOB 208. A prediction pipeline (e.g., prediction pipeline 554 depicted in FIG. 5) is configured for using BTB data from BTB1 206 (including BTB1 206_0 and B2B1_1) and LOB data from LOB 208 to make predictions via prediction logic 230 of processor 101. In metadata predictor 200, index and prediction pipelines 552 and 554 are decoupled and operate independently of each other, in addition to operating asynchronously to instruction execution pipeline 250. Further, it should be appreciated that a second-level hierarchical predictor (e.g., BTB2) is incorporated into the index pipeline of the metadata predictor with the prediction cache (e.g., LOB 208). Although the predictors are described as branch target buffers (BTBs such as BTB1 and BTB2) which are a type of branch predictor, one or more embodiments are applicable to other types of predictors.

Branch prediction latency can be a source of performance issues for any processor; the downstream pipeline must accurately fetch instruction text as quickly as possible to maintain a low cycle per instruction (CPI). Accurate branch predictions allow for such fetching. However, if no prediction is available, the processor could: continue ahead and risk a branch wrong penalty for fetching the wrong instruction text or wait for a new branch prediction to become available, thus increasing CPI. According to one or more embodiments, buffering in LIB 204 and LOB 208 and reuse of prediction metadata in LOB 208 allow for low latency branch predictions, thereby keeping instruction fetching ahead of instruction execution, as well as providing power saving benefits. The decoupling of the index and prediction pipelines 552, 554 allows the index pipeline 552 to get ahead of the prediction pipeline 554, which can hide other prediction latency inducing events (e.g., read/write collisions, etc.). Further, the index pipeline 552 is to be read ahead of prediction pipeline 554 in order to allow the prediction pipeline 554 to generate predictions as quickly as possible.

As seen in FIG. 3, LIB 204 is filled with line addresses in the sequence it believes they will be encountered in the program. LIB 204 and BTB2 indexing logic 242 are populated from restarts, which can be external to the prediction logic coming from the processor pipeline or internal to the prediction logic coming from prediction pipeline 554. LIB 204 is also populated with sequential addresses and can be populated with a predicted sequence of lines from a line index accelerator 202, which is discussed further herein.

In metadata predictor 101 with a prediction cache (e.g., LOB 208), BTB1 206 is read on a line basis and output is written into a prediction cache to be reused while staying within that line. The index pipeline is for reading BTB1 206 and putting its output into the prediction cache which is LOB 208. The output of LOB 208 is fed into the prediction pipeline (including prediction logic 230) which makes the actual predictions and determines if the next set of predictions is to be made from within the same current line and/or in a different line and whether or not that next line is already in LOB 208 or is different from what the LOB contains.

Figure 7:
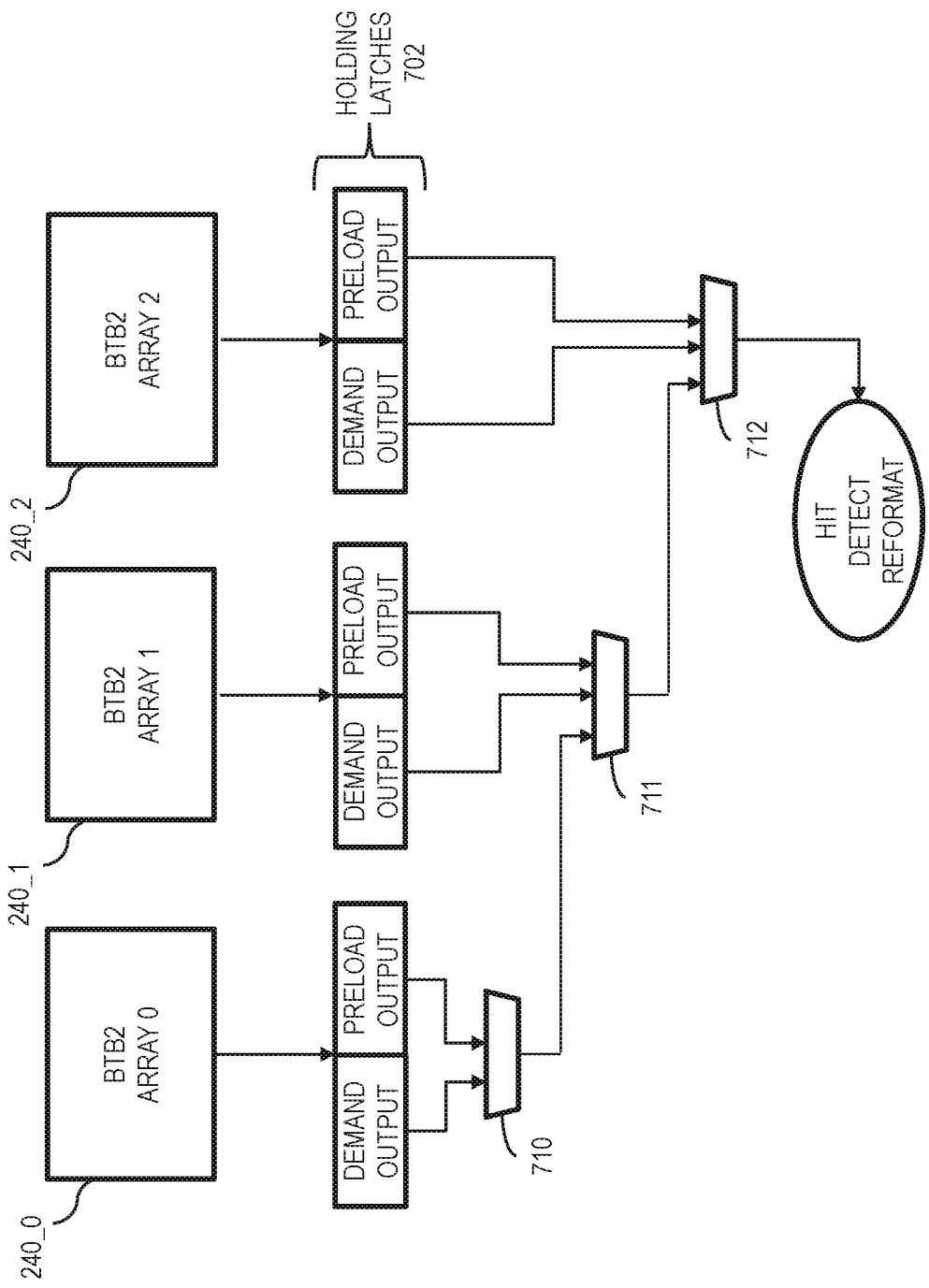
FIG. 7 depicts a block diagram illustrating data return with distributed multiplexing and page mode in accordance with one or more embodiments of the present invention.

BTB2 indexing logic 242 is logic for indexing (i.e., querying) BTB2 240. The output of BTB2 240 is a line of metadata that is passed to hit detection and reformatting logic 246. Hit detection and reformatting logic 246 is configured to convert the line of metadata from the BTB2 format into the BTB1 format that can be stored as a line of metadata in BTB1 and well as to be stored in LOB 208. A multiplexer (mux) is configured to select between BTB2 hit data (i.e., line of metadata) and BTB1 output (i.e., line of metadata) for storage into the BTB prediction cache (e.g., LOB 208) in the index pipeline. Upon writing new lines of metadata into BTB1 206 from BTB2 240 (e.g., after reformatting by hit detection and reformatting logic 246), semi-inclusive manager 244 is configured to cause victims to be written into BTB2 240, where the victims are one or more lines of metadata previously stored in BTB1 206 prior to writing the new lines in BTB1 206. The BTB1 victims are the cast out entries upon writing the BTB1 206 with new line content from surprise installs and/or BTB2 hits. BTB1 surprise install victims require reading BTB1 206 before performing a new install. The reading of BTB1 206 can be staged through the processor pipeline and/or re-read at the time frame of performing the install. The BTB1 demand victims are naturally read from the index pipeline 552. The BTB1 preload victims require reading the BTB1 206 while performing the BTB2 read process. When accessing the BTB2 240, BTB2 indexing logic 242 is configured to search BTB2 240 for the line of metadata that is missing (demand) from BTB1 206 and for lines nearby (preload) (as depicted in FIG. 7). Various algorithms including heuristics can be used to determine which lines to preload. One approach may be to search for lines in the same page, although other approaches are possible. In one or more embodiments, the preload data can have the same granularity as the demand data and/or a larger granularity than the demand data. Preload lines might be sequential and needed soon in prediction pipeline 554. In one or more embodiments, the BTB1 206 can be read to output any preload victim lines in order to write the BTB1 preload victim lines into the BTB2 240, because the BTB1 preload victim lines which are associated with and/or related to the BTB1 demand victim line. The demand victim line can be determined using any known technique, such as first-in first-out (FIFO), least recently used (LRU), oldest, etc. In one or more embodiments using a direct mapped implementation, there is no decision to make to choose the victim because there is only one entry in the addressed/indexed location. It is noted that finding one or more preload lines (i.e., preload output) in BTB2 240 causes metadata predictor 200 to search and find the corresponding one or more preload victim lines of metadata in BTB1 206, which are to be evicted from BTB1 206 when the preload lines are stored in BTB1 206. Accordingly, these preload victim lines of metadata in BTB1 206 are read from BTB1 206 in order to have this victim data written to BTB2 240 in case of a preload BTB2 hit. In one or more embodiments, the preload line information from BTB2 240 may be read as part of the second-level search process triggered by the demand miss.

Semi-inclusive manager 244 is configured to write the victim lines of metadata from BTB1 206 to BTB2 240 under various conditions, such as if the victims are not already in BTB2 240 and/or if BTB2 240 does not contain the updated content for the victim lines of metadata where the update occurred in BTB1 206. Semi-inclusive manager 244 can utilize different techniques to manage this hierarchy. In one or more embodiments, semi-inclusive manager 244 can store a change bit and/or flag anytime content is updated for a line of metadata in BTB1 206. Each line of metadata in BTB1 206 has a one-to-one relationship to its own change bit/flag where, for example, a "1" bit and/or flag "on" in the change bit field denotes that content is updated, while a "0" bit and/or flag "off" denotes that the content has not changed. In one or more embodiments, semi-inclusive manager 244 can store a BTB2 presence bit and/or flag which denotes whether a line of metadata in BTB1 206 is also present in BTB2 240. In other words, the BTB2 presence bit/flag tells semi-inclusive manager 244 whether BTB2 240 has a line of metadata corresponding to the same line of metadata in BTB1 206. Each line of metadata in BTB1 206 has a one-to-one relationship to its own presence bit/flag where, for example, a "1" bit and/or flag "on" in the BTB2 presence bit/flag field denotes that line of metadata is present in BTB2 240, while a "0" bit and/or flag "off" denotes that the line of metadata is absent from BTB2 240. The change bit/flag field and the BTB2 presence bit/flag field can be stored in semi-inclusive manager 244, BTB1 206, and/or in another memory structure, such that each line of metadata has its own dedicated change bit/flag field and the BTB2 presence bit/flag field. Because BTB1 206 has a limited capacity, a line of metadata is to be evicted as the victim line when a new line of metadata is to be written to BTB1 206, for example, as a policy.

A few example scenarios are discussed for explanation purposes and not limitation. When there is a hit in BTB2 240 using the index from BTB2 indexing logic 242, semi-inclusive manager 244 is utilized to bring the output line of metadata into BTB1 206; when semi-inclusive manager 244 determines that a victim line of metadata currently stored in BTB1 206 has been changed (i.e., updated) in the change bit/flag field, semi-inclusive manager 244 is configured to cause the changed line of metadata (e.g., BTB1 victim in FIG. 3) to be stored in BTB2 240 and then subsequently removed from BTB1 206. Correspondingly, the output line of metadata (i.e., BTB2 hit data) from BTB2 240 is stored in BTB1 206, thereby directly making use of the metadata information brought in from the second-level structure (i.e., BTB2 240). There can be various reasons in which the victim line of metadata has been changed in BTB1 206. In one example, there can be one or more branches in the victim line of metadata that have changed from taken to not taken or vice versa. Also, there can be one or more branches in the victim line of metadata that have changed their respective target addresses. It is noted that the victim line of metadata includes multiple branches, and the update/change could have occurred for any one of the branches. Additionally, another example of a changed BTB1 entry is when a new surprise statically-guessed taken or resolved taken branch is added to the line-based entry in the BTB1. Yet another example of a changed BTB1 entry in a parent-based implementation is upon line splitting line-size reconfiguration, one or more branches that were previously in an entry are invalidated. In metadata predictors containing information about non-branch instructions potentially in addition to branch instruction, an example of a changed entry would be installing instruction metadata about a load instruction discovered to be dependent on a separate store instruction.

When there is a hit in BTB2 240 using the index from BTB2 indexing logic 242, semi-inclusive manager 244 is utilized to bring the output line of metadata into BTB1 206; when semi-inclusive manager 244 determines that the victim line of metadata currently stored in BTB1 206 is absent from BTB2 240 using the presence bit/flag field, semi-inclusive manager 244 is configured to cause the (absent) line of metadata (e.g., BTB1 victim in FIG. 3) to be stored in BTB2 240 and then subsequently removed from BTB1 206. Similarly, the output line of metadata (i.e., BTB2 hit data) from BTB2 240 is stored in BTB1 206, thereby directly making use of the metadata information brought in from the second-level structure (i.e., BTB2 240).

Although both the change bit/flag and the presence bit/flag can be utilized for each of line of metadata in BTB1 206, one or more embodiments may just use the change bit/flag without using the presence bit/flag because semi-inclusive manager 244 can be configured set to the change bit/flag to "1" or "on" for lines of metadata that are absent in BTB2 240 of the second level and when any entry in the line of metadata has been updated in BTB1 206. In this case, the change bit/flag can represent a combined changed in the first level compared to the second level and/or the line of metadata not being in the second level. However, benefits of storing this information separately (e.g., having a separate change bit/flag and presence bit/flag) are that the semi-inclusive manager 244 can also store location information about where in BTB2 240 the entry is located in order to encourage putting it back in the same place it came from when possible.

Figure 8:
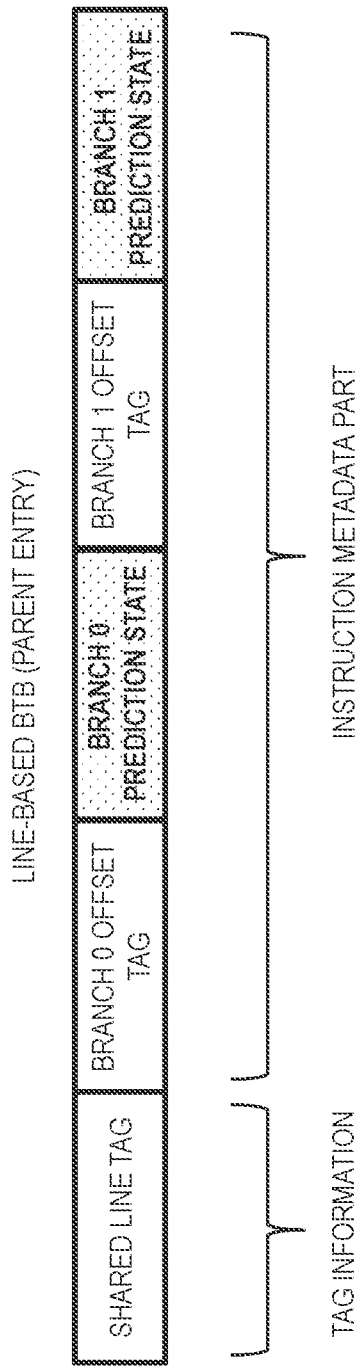
FIG. 8 depicts a block diagram of an example line of metadata in accordance with one or more embodiments of the present invention.

Further regarding a hit whether in BTB1 206 using an index from LIB 204 and/or in BTB2 240 using BTB2 indexing logic 242, FIG. 8 illustrates an example line of metadata. In the example line of metadata depicted in FIG. 8, the line-based entry contains multiple branches in the same line in which the branches are tracked together and share the line tag. The branch prediction state includes the target address that the corresponding branch instruction is to take. The branch prediction state can include direction prediction state such as a bimodal 2-bit saturating counter also known as branch history table (BHT) content. The branch prediction state can be updated, and accordingly, semi-inclusive manager 244 is configured to set the change bit/flag to "1" or "on" when the branch prediction state for at least one branch in the line of metadata has changed.

With regard to the index or index line used to query BTB1 206 and/or BTB2 240, there is an instruction metadata part which is an index into the structures and part of which is used as tag information. The index determines which row/entry of the table is read out in BTB1 and/or BTB2. The content contains state such as validity bits and tag bits. A hit (e.g., match) is determined based on the entry being set as valid and tag bits in the entry of in BTB1 and/or BTB2 matching tag bits of the search address in the index.

A miss can be a partial miss and/or a full miss. A full miss is when the BTB (which could be BTB1 and/or BTB2) does not contain any of the index information (e.g., tag bits) in the line of metadata. For example, none of the branch instructions being searched for are present in the BTB (which could be BTB1 and/or BTB2); accordingly, this may be considered a full miss. A partial miss is when the BTB (which could be BTB1 and/or BTB2) contains part of but not all of the index information (e.g., part of the tag bits) in the line of metadata. For example, the line of metadata may contain information for one or more branch instructions but fails to contain information for one or more other branch instructions being queried by the index. The process of searching BTB2 240 at the second level (e.g., to determine a hit) is triggered by a miss in BTB1 206 at the first level. Accordingly, the line of metadata being brought in from BTB2 240 and stored in BTB1 206 corresponds to a previous search and miss of that line at BTB1 206, and the line of metadata was found in BTB2 240. Although an example partial miss and full miss have been discussed for explanation purposes, it should be appreciated that additional implementations can be utilized.

Figure 5:
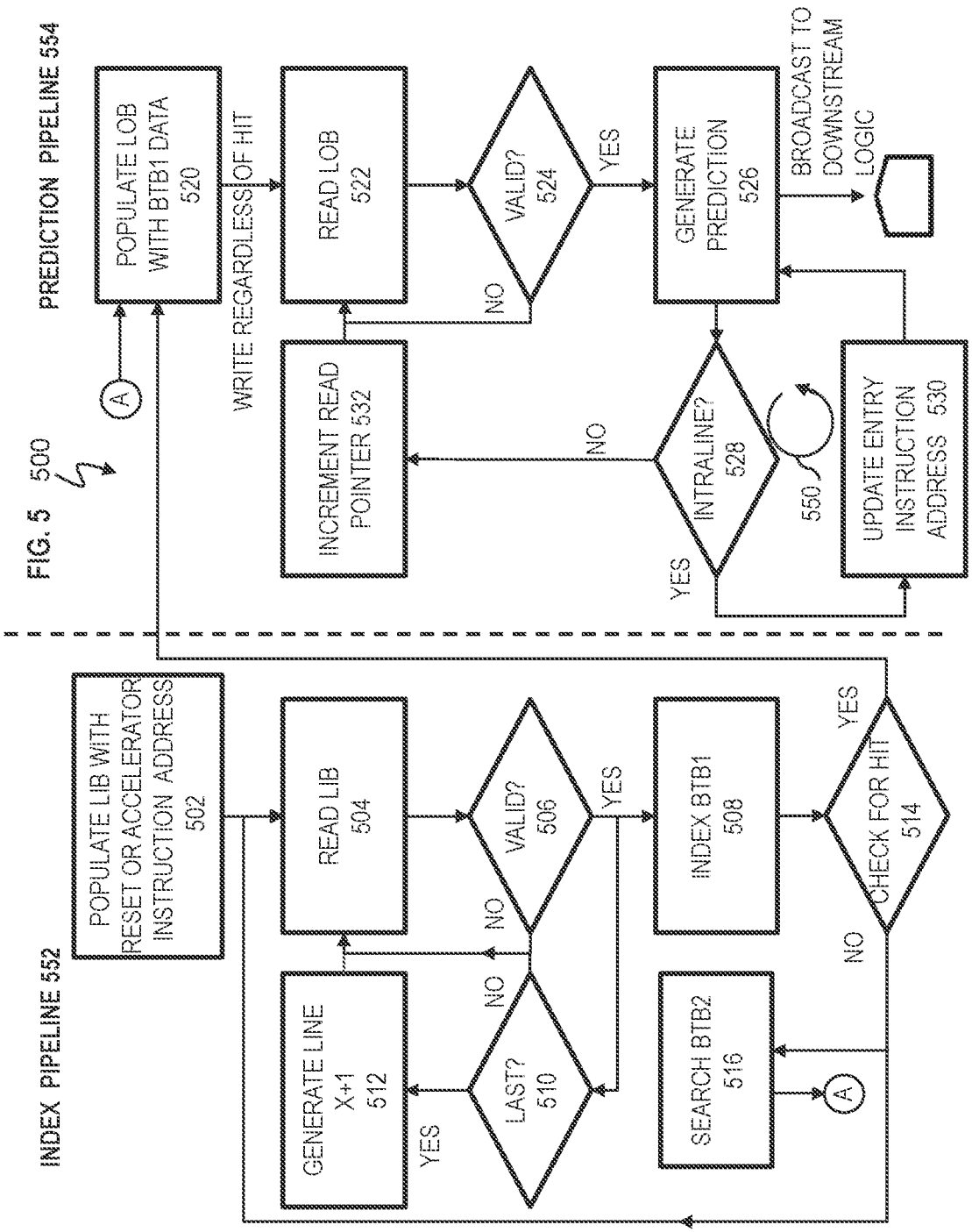
FIG. 5 depicts a block diagram of a metadata predictor process in accordance with one or more embodiments of the present invention.

To further illustrate details of index pipeline 552 and prediction pipeline 554, FIG. 5 depicts a metadata prediction cache process 500 for metadata predictor 200 in accordance with one or more embodiments. The metadata prediction cache process 500 is a computer-implemented process implemented by processor 101 in FIGS. 1, 2, 3, and 4, along with other figures discussed herein. The description of the metadata prediction cache process 500 shown in FIG. 5 is provided with reference, where appropriate, to FIGS. 1, 2, 3, and 4.

At block 502 of the index pipeline 552, metadata predictor 200 is configured to populate LIB 204. LIB 204 can be populated with a reset instruction address from instruction execution pipeline 250 and/or prediction logic 230. Additionally, LIB 204 can be populated by an accelerator instruction address. The accelerator instruction address can be sent to LIB 204 from line index accelerator 202. More regarding line index accelerator 202 is discussed further herein. LIB 204 is a first in first out buffer (FIFO). The reset instruction is used to provide an index and/or index line in LIB 204, and the index line is stored and eventually utilized to search and/or query BTB1 206. The index and/or index line in LIB 204 refers to a subset of instruction address bits that are used by LIB 204 to access BTB1 206. In one or more embodiments, each entry in BTB1 206 may represent a 128 byte (B) line; based on the size of the BTB1, an index/index line in LIB 204 can use a subset of instruction address bits (e.g., a subset of the 128 B line), such as instruction address bits (48:56) which refer to instruction address bits 48-56 of the instruction address that is utilized to read BTB1 206. In one or more embodiments, the index/index line in LIB 204 can be any predefined subset of instruction address bit, and 128 B is illustrated for example purposes. Accordingly, an index line of LIB 204 is utilized to query BTB1 206. Further, an instruction execution pipeline event of the instruction execution pipeline 250, such as a branch wrong, can restart index pipeline 552, prediction pipeline 554, and line index accelerator 202.

At block 504, metadata predictor 200 (e.g., using LIB logic 224) is configured read out LIB 204, thereby causing indices with instruction addresses to be read out from LIB 204. LIB 204 may read out an index for an instruction address at a time.

At block 506, metadata predictor 200 (e.g., using LIB logic 224) is configured to check if the received instruction address is valid or not. Metadata predictor 200 (e.g., using LIB logic 224) is configured check if an actual instruction address is read out from LIB 204 or whether the output is empty. Each instruction address may be read out one at a time (e.g., serially) as an entry in a line (e.g., cache line), and/or as a group/block of entries. If ("NO") the instruction address is empty, flow returns to block 504 and metadata predictor 200 (e.g., using LIB logic 224) is configured to read LIB 204 which should have been populated with indices. If "YES" the instruction address is valid (i.e., present), flow proceeds to block 508. Also, if "YES" the instruction address is valid (i.e., present), metadata predictor 200 (e.g., using LIB logic 224) is configured to check if this is the last valid entry in the LIB 204 at block 510. For example, metadata predictor 200 can check if there is or is not another valid line address in the LIB. If this is not ("NO") the last entry in the current line, metadata predictor 200 (e.g., using LIB logic 224) is configured to read out the next entry in the LIB by returning to block 504. If ("YES") this is the last entry in the current line of LIB 204, metadata predictor 200 (e.g., using LIB logic 224) is configured to generate line X+1 by proceeding to the next consecutive line after the current line (e.g., line X), thereby adding a new entry in the LIB for line X+1 to be used next for querying the LIB 204 at block 512, and flow returns to block 504. For example, line X+1 refers to the next consecutive 128 B line of instruction text after line X.

At block 508, metadata predictor 200 is configured to index BTB1 206 by sending a list of indices (e.g., search tags) from LIB 204 to access and query BTB1 206. Although not shown, various queues can be utilized in index pipeline 552 and prediction pipeline 554 for holding data when applicable. As a branch target buffer, BTB1 206 contains and tracks branches for instructions that have been guessed taken (and/or resolved taken) and not taken, along with their direction. BTB1 206 is a large array and/or cache that contains metadata about branch details. BTB1 206 holds instruction address bits as tags in preparation for search.

At block 514, metadata predictor 200 is configured to check for a hit in BTB1 206. If there is not ("NO") a hit, flow returns to block 504 and flow proceeds to block 516 to search for the same line of metadata in BTB2 240. If "YES" there is a hit, flow proceeds to block 520. The tags (for example) in the BTB1 are compared with the current search tag in the index. If they match, then the line of metadata read from the BTB1 will be used as an input to the prediction pipeline 554. If the tag in BTB1 does not match current search tag, then the line is not used for prediction. In one or more embodiments, whether or not there is a hit does not influence flow, and metadata predictor 200 can write the metadata to the LOB regardless of the hit. Accordingly, the "No" path could be modified based on the implementation, and one implementation may choose to drop that metadata, since it cannot be used for prediction.

At block 520 of the prediction pipeline 554, metadata predictor 200 (e.g., using LOB logic 228) is configured to populate LOB 208 with data from BTB1 206. It is noted that LIB 204 and LOB 208 are smaller in size and capacity than BTB1 206. LOB 208 is populated with data from the cache hits of BTB1 206. Just as BTB1 206, LOB 208 stores branch and target address information, including locations, directions, and targets. It should be appreciated that, although BTB1 and LOB can be utilized for branch predictions, they can be utilized with any metadata for any purpose.

At block 522, metadata predictor 200 (e.g., using LOB logic 228) is configured to read out the line (e.g., cache line) in LOB 208. For example, an index/index line from LIB 204 is used to read the line of metadata from BTB1 206. In one or more embodiments, the output of LOB 208 is the line of branch prediction metadata associated with the 128 B line of instruction text that has been search for by the index from LIB 204.

At block 524, metadata predictor 200 (e.g., using LOB logic 228) is configured to check if anything was read out (e.g., was a line of metadata for an instruction address read out) for the line of LOB 208. If data was not read out ("NO") for the cache line (i.e., empty), flow returns to block 522. If "YES" data (e.g., line of metadata for the instruction address) was read out, metadata predictor 200 (e.g., using LOB logic 228) is configured to generate the prediction and send the prediction (e.g., instruction addresses of predicted branches, whether each is predicted not-taken or taken, and for a predicted taken branch, its predicted target address) downstream at block 526. For example, the predicted target address is sent to the instruction cache and merger (ICM) unit and the instruction decode and dispatch unit (IDU) of instruction execution pipeline 250 for processing. Additionally, at block 528, metadata predictor 200 (e.g., using LOB logic 228) is configured to check if the predicted target address in the line of metadata is intraline. When the predicted target address is intraline, this means that the predicted target address is in the same/current line of metadata for the instruction text that was read out of LOB 208. If "YES" the predicted target address is in the current line read out from LOB 208, at block 530, metadata predictor 200 (e.g., using LOB logic 228) is configured to update the entry instruction address and output the updated entry instruction address (which is the next target address on the same line) to be used to generate another prediction without requiring another line be read from LOB 208; flow returns to block 530. Update the entry instruction address refers to state maintained in the prediction pipeline search logic. This is the instruction address to start searching from. Predictions are reported for instructions at addresses equal to or greater than this entry instruction address. The entry address needs to be updated when staying intraline based on the target address of each intraline DGT branch. Update the entry instruction address refers to which branches will be considered next for prediction. Continuing the example of using 128 B lines, assume the first search of this line was at byte 20 of that 128 B line. This means, if there are branches in bytes 0 to 19, metadata predictor 200 is not interested in those branches because processing has already branched beyond that instruction text. An intraline branch may take metadata predictor 200 right back to byte 20 (e.g., in the case of a small loop), but it could possibly take processing to a different byte. If the target of the intraline branch were to take processing to byte 10 instead of byte 20, then metadata predictor 200 would have to consider any branches in bytes 10 to 19, even though metadata predictor 200 did not on the last prediction. So, effectively, the search start position is being moved based on the intraline target. Blocks 526, 528, and 530 can continue executing loop 550 in the prediction pipeline 554 that generates new predictions using the current line with an updated instruction address (i.e., updated target address), thereby making metadata predictor 200 faster by not having to read out another/subsequent line (or entry).

If the predicted target address is not intraline ("NO"), metadata predictor 200 (e.g., using LOB logic 228) is configured to increment the read pointer at block 532, and flow returns to block 522. This causes LOB 208 to read out the next line, which is to move on to the next entry in LOB 208. In one or more embodiments, the LOB, like the LIB, can be implemented to be FIFO, while other implementations are possible. So, if metadata predictor 200 determines that there is no intraline branch, this means it is done with this LOB entry and can increment to the next entry in the FIFO.

Figure 6:
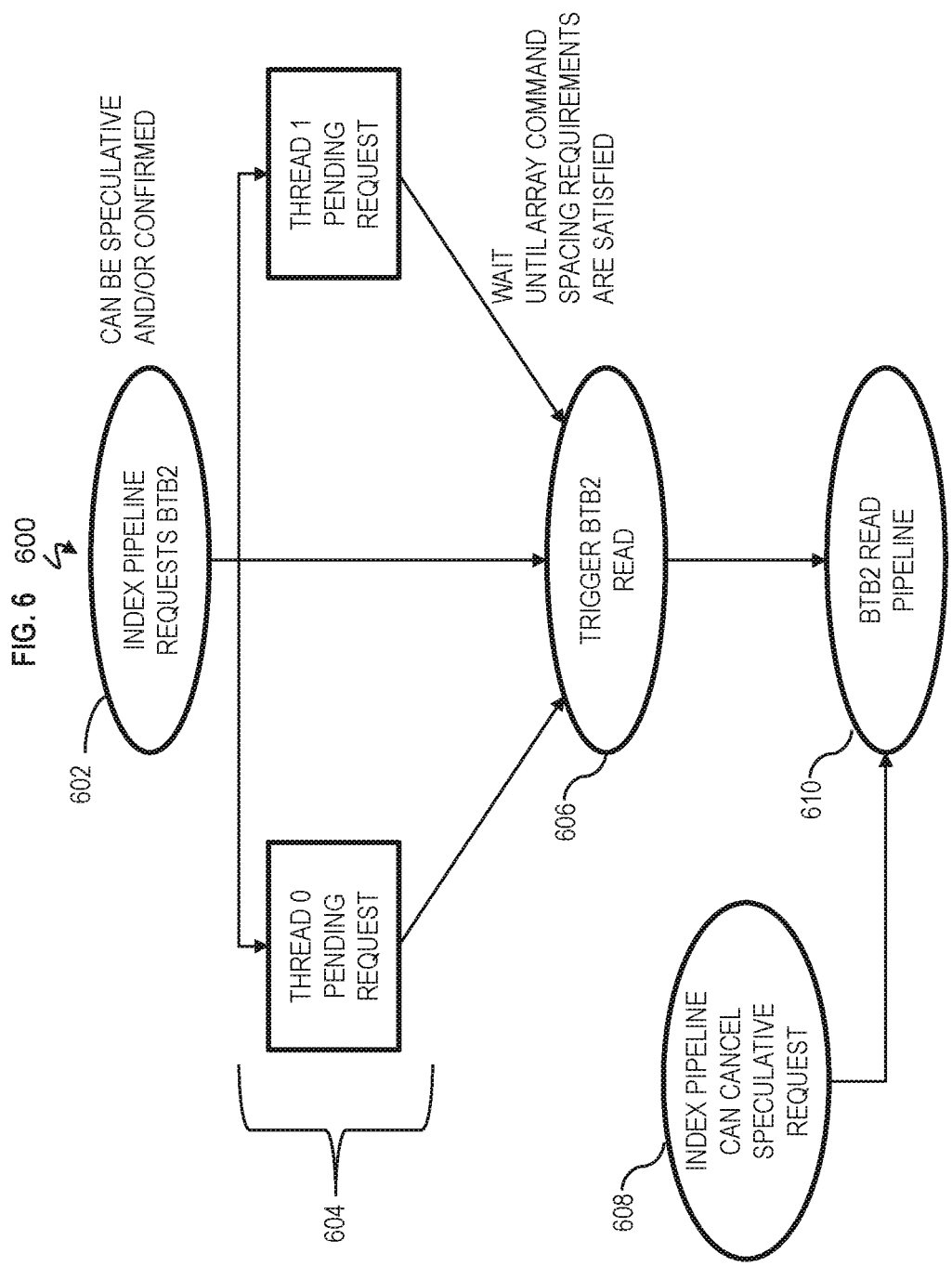
FIG. 6 depicts a block diagram of a flow for triggering second-level reads in accordance with one or more embodiments of the present invention.

FIG. 6 is a block diagram of flowchart 600 for triggering BTB2 reads in accordance with one or more embodiments. As noted herein, a line based hit versus miss means all branches for that line (or part of line with parent-based variable line size) are either in the BTB1 are not. BTB2 indexing logic 242 is triggered by index pipeline 552, for example, when there is miss when indexing BTB2 240. One or more embodiments are able to accommodate different definitions of BTB1 misses. BTB2 indexing logic 242 can be triggered upon not finding content for the line of metadata currently being searched for in BTB1 206. Additionally and/or alternatively, more complex methods can be employed to distinguish cases where content is missing due to capacity limitations of BTB1 206 (e.g., the first-level predictor) from cases where content is missing because there are no relevant types of instructions, for example, no branches, in the section of code being searched.

As seen at block 602 in FIG. 6, index pipeline 552 is configured to initiate a BTB2 search request (as depicted at block 516 in FIG. 5), which can either trigger a BTB2 read immediately and/or be queued and acted upon later. A BTB2 read may have to wait until array command spacing requirements are satisfied. Therefore, each thread in a multi-threaded design may queue a pending request and hold that information until the BTB2 pipeline becomes available at block 604. At such a time, the pending request can trigger a BTB2 read at block 606. At block 610, the BTB2 read process includes a pipeline of sending the index to the array(s) of BTB2 240, accessing those arrays, returning the data, hit detection, and muxing of that data into index pipeline 552.

A BTB2 access can be triggered once it is confirmed that there is a BTB1 miss and/or performed earlier to save latency, and the BTB2 access can be triggered speculatively and cancelled if it turns out the speculative access of data was not actually needed at block 608. Speculative BTB2 index could occur upon every BTB1 index of BTB1 206. Additionally, other techniques can be employed to selectively speculate when to read BTB2 240. An example would be to trigger speculative indexing (only) after external restarts. Many other approaches for when to trigger requests speculatively are possible and can be included in one or more embodiments.

FIG. 7 is a block diagram depicting data return with distributed multiplexing/muxing and page mode in accordance with one or more embodiments. The BTB2, or more particularly a parent-based partition of the BTB2, can be composed of multiple separate array instances such as BTB2 240 0, BTB2 240_1, BTB2 240_2 (generally referred to as BTB2 240) in one or more embodiments. BTB2 index bits can select an appropriate instance. Page mode can be employed to minimize the number of read operations and share wires for demand and preload data. When accessing an array for BTB2 240, multiple lines of metadata can be read. All lines of metadata may be associated with the same page such as a continuous region of program space. That region would include one demand line and one more or more preload lines in holding latches 702. The read data would be captured and over time would be returned on the data return multiplexer (mux) (e.g., multiplexers 710, 711, 712, for example, one line at a time. FIG. 7 illustrates one demand line output and one preload line output per array with distributed data return muxing in order to select one of the lines from the selected array. The muxing can pass through the neighboring array output data if it is not the selected array. Other implementations are possible to return preload data without employing page mode, for example, which would require indexing the array repeatedly for all the lines requested. The demand line output refers to the actual line of metadata that has been queried, and preload line output refers to a contiguous line of metadata. For example, the demand line output could be a line of metadata this is 128 B, while the contiguous line of metadata is the next, or prior, adjacent line of 128 B.

Figure 9:
FIG. 9 depicts a block diagram of an example index utilized to query a second-level structure in accordance with one or more embodiments of the present invention.

FIG. 9 is a block diagram of an example BTB2 index used by BTB2 indexing logic to query the BTB2 in accordance with one or more embodiments. An example BTB2 line index can be formed as a subset of an instruction address. Subsets of a 64-bit instruction address can be defined appropriately. For example, with a 128 byte line size, a line address would consist of address bits 0:56 as illustrated in FIG. 9. With a 256 byte page size, a page address would consist of address bits 0:55. Using a 256 byte page size means there are 2 lines (128 bytes each) per page. The BTB2 index bits would be Y:56, and the BTB entries would contain a line tag consisting of bits X:Y−1. As an example scenario, it may be assumed that X=32, Y=44, Y−1=43. These values depend on the size of the BTB2 (e.g., Y:56 are the index and the depth is therefore $2^{(56-Y+1)}$ rows). X:Y−1 determines the size of the tag in the BTB2. In one case, X=0 would be a full tag, while X>0 means only a partial tag is stored (e.g., X much greater than could be 32). As an example, 44:56 means a 13 bit index which is 8K=8192 rows. Also, 32:43 for the tag means 12 tag bits in each of the entries. BTB2 index bits would be based on the depth of the structure. For example, a 2048 (2K) line deep structure would require 11 index bits, and therefore would be bits 46:56. Bits to the left of this would be used as line tag bits. The tag could be bits 0:45. Additionally and/or alternately, a partial tag could be maintained such as bits 32:45. More complicated tags and indexing are possible, which could be utilized in one or more embodiments. For example, a more complicated technique could include performing an exclusive-or operation on multiple address bits to form a single index or tag bit. Hit detection consists of comparing the tag read from the array (e.g., BTB2 240) against a search address tag in the index (i.e., query).

FIG. 10 is a block diagram of a pipeline illustration using a speculative second level search (e.g., speculative BTB2 search) according to one or more embodiments. In FIG. 10, BTB2 indexing logic 242 is configured to search for the line of metadata in BTB2 240, before the line is needed such as, for example, before a miss at BTB1 206, thereby being referred to as a speculative search. This could occur while BTB1 206 is being searched. FIG. 11 is a block diagram of a pipeline illustration using a nonspeculative second level search (e.g., nonspeculative BTB2 search) according to one or more embodiments. In FIG. 11, BTB2 indexing logic 242 is configured to search for the line of metadata in BTB2 240, after the line is needed such as, for example, after a miss at BTB1 206. In this case, it is confirmed that the line of metadata is needed from BTB2 240 because of the miss in BTB1 206, thereby being referred to as a nonspeculative search.

The example pipelines in FIGS. 10 and 11 illustrate how a BTB2 can be incorporated into the system index pipeline. FIG. 10 illustrates the example scenario where a speculative BTB2 access is triggered in the b1+1 cycle of a BTB1 access in the index pipeline, while FIG. 11 is a nonspeculative example where a nonspeculative BTB2 access is triggered in the b1+4 cycle of the index pipeline after it is known whether the search may require content contained in the BTB2. When a BTB2 access is believed to be needed, the index pipeline stalls for that thread and waits for the BTB2 content to be returned. In a parent-based design, some parents may have content for the line in the BTB1 and others may not. For the ones (i.e., parents) that have matching BTB1 content, BTB2 activity would be suppressed. However, (only) for the ones (i.e., parents) that did not hit in the BTB1, BTB2 indexing logic 242 would power up BTB2 searches.

In FIGS. 10 and 11, the BTB2 search pipeline is labelled with cycles starting with u0 when the BTB2 is indexed. In this example with one preload line in a 2-line page, the u3 cycle triggers a preload line BTB1 b0 read. The purpose of this read is to access BTB1 victim information and to write into the BTB2 in the event that the BTB2 preload read finds a hit that is to be written into the BTB1. The u4 cycle transfers demand BTB2 data on the return wire bus. The u6 cycle transfers preload BTB2 data on the return wire bus. After reformatting the BTB2 data and doing hit detection in the u5 (demand) and u7 (preload) cycles, BTB2 hits are written into the BTB1 (u6 and u8) and BTB1 victims are written into the BTB2 (u6 and u8). In the u5 cycle, the index pipeline is resumed. This can be a true b0 and actually re-index the BTB1, and/or it might not require an actual re-index if the BTB1 content from the initial read is preserved in the LOB rather than cleared. In the b1 cycle of the resumed index pipeline, output from the BTB2 can be bypassed/muxed with the BTB1 output data. BTB2 data would be selected if there was a BTB2 hit. At that point, the index pipeline would proceed as normal and either bypass its results into the prediction pipeline and/or write its results into the LOB to be used when needed by the prediction pipeline.

Although example pipelines are illustrated for explanation purposes, it is contemplated that systems may implement different pipeline specifics from the ones illustrated. Nevertheless, the types of activities would be the same or analogous but may occur in different cycles. In systems where the index pipeline is time multiplexed among threads, it may be possible for the BTB2 return having been resumed in the index pipeline to affect the index pipeline thread priority. Alternatively and/or additionally, the thread priority of the index pipeline may be determined by other factors, and the index pipeline would resume for the thread with a BTB2 return upon its next natural cycle to do a b0. In systems with sequential indexing, the BTB2 preload might be for the line sequentially after the demand line. In such cases, capabilities to bypass the BTB2 data from the preload hit into the index pipeline could be implemented.

There are many technical benefits and technical solutions by using a processor having an integrated semi-inclusive hierarchical metadata predictor in accordance with one or more embodiments. Technical benefits and solutions include enabling incorporation of a high-capacity hierarchical metadata predictor in a system with a predictor cache and optionally also parent-based variable line size. Parent-based partitioning minimizes wire lengths and works in a straightforward way with a parent-based BTB1 and BTB2. One or more embodiments ensure that the most recent learning in the first-level structure is evicted into the second-level structure, thereby being preserved for future use. One or more embodiments work in a system with a line-based prediction cache (LIB plus LOB) as part of the index pipeline. One or more embodiments provide an inline second-level predictor (e.g., BTB2) rather than bulk preload which would not directly use the newly read second-level content to make predictions immediately. One or more embodiments provide demand and preload data. One or more embodiments are able to avoid multiple overlapping requests for the same thread.

FIG. 12 is a flowchart of a computer-implemented method 1200 for an integrated semi-inclusive hierarchical metadata predictor 200 in accordance with one or more embodiments of the invention. Computer-implemented method 1200 may be performed using computer system 100 in FIG. 1. Processors 101 in FIG. 1 along with or any other processor discussed herein can include and/or implement functions of metadata predictor 200 discussed herein. As noted herein, functions of processor 101 can be used and/or implemented in hardware components of hardware and software layer 60 depicted in FIG. 21.

At block 1202 of computer-implemented method 1200, integrated semi-inclusive hierarchical metadata predictor 200 (e.g., using BTB2 indexing logic 242) is configured to determine a hit in a second-level structure (e.g., BTB2 240), the hit being associated with a line of metadata in the second-level structure (e.g., BTB2 240). At block 1204, integrated semi-inclusive hierarchical metadata predictor 200 (e.g., using semi-inclusive manager 244) is configured to, responsive to determining that a victim line of metadata in a first-level structure (e.g., BTB1 206) meets at least one condition, store the victim line of metadata in the second-level structure (e.g., BTB2 240). At block 1206, integrated semi-inclusive hierarchical metadata predictor 200 is configured to store the line of metadata from the second-level structure (e.g., BTB2 240) in a first-level structure (e.g., BTB1 240) to be utilized to facilitate performance of a processor (e.g., processor 101), the line of metadata including entries for a plurality of instructions.

The at least one condition includes an indication that the victim line of metadata has been updated, for example, based on semi-inclusive manager 244 using a change bit/flag. The at least one condition comprises an indication that the victim line of metadata is absent from the second-level structure, for example, based on semi-inclusive manager 244 using a presence bit/flag.

The determining the hit in the second-level structure (e.g., BTB2 240) is performed responsive to determining that the line of metadata is a miss in the first-level structure (e.g., BTB1 206). The line of metadata from the second-level structure is provided to a prediction cache (e.g., LOB 208) which is coupled to prediction logic (e.g., prediction logic 230), such that the prediction logic utilizes output from the prediction cache (e.g., LOB 208) to make metadata predictions. The line of metadata from the second-level structure may be provided directly to the prediction pipeline 554 with and/or without using an intervening LOB 208. The second-level structure (e.g., BTB2 240) is configured to be searched for a preload line of metadata (e.g., such preload output depicted in FIG. 7) associated with a preload victim line of metadata (e.g., in BTB1 206), the first-level structure (e.g., BTB1 206) being searched to provide the preload victim line of metadata; the preload line of metadata is written into the first-level structure and provided to a prediction pipeline 554, responsive to be requested. For example, in some cases, the preload line of metadata (e.g., preload output in FIG. 7)

may match the next demand line that is needed by the index pipeline/prediction pipeline/process, and the preload line of metadata (e.g., preload output) is used directly by prediction logic 230; in that case, the prediction logic 230 determines that the next prediction is the same as the preload line of metadata and thus requests the prediction logic 230.

The preload line of metadata is provided to a prediction cache, along with demand line of metadata from BTB2 240. A prediction pipeline 554 is stalled until the second-level structure (e.g., BTB2 240) makes a determination about whether there is the hit (or miss), the prediction pipeline 554 being configured to resume responsive to the determination (of a hit or miss) and configured to use the line of metadata associated with the hit. The output from BTB2 240 is directly integrated into the prediction process of prediction pipeline 554, with and/or without using an intervening LOB 208. In one or more embodiments with LOB 208, it may be useful to implement this second-level search process as part of the index pipeline 552 rather than the prediction pipeline 554; this is because the index pipeline 552 can run ahead of the prediction pipeline 554 and can advantageously hide the penalty or latency for the first-level miss.

Figure 13:
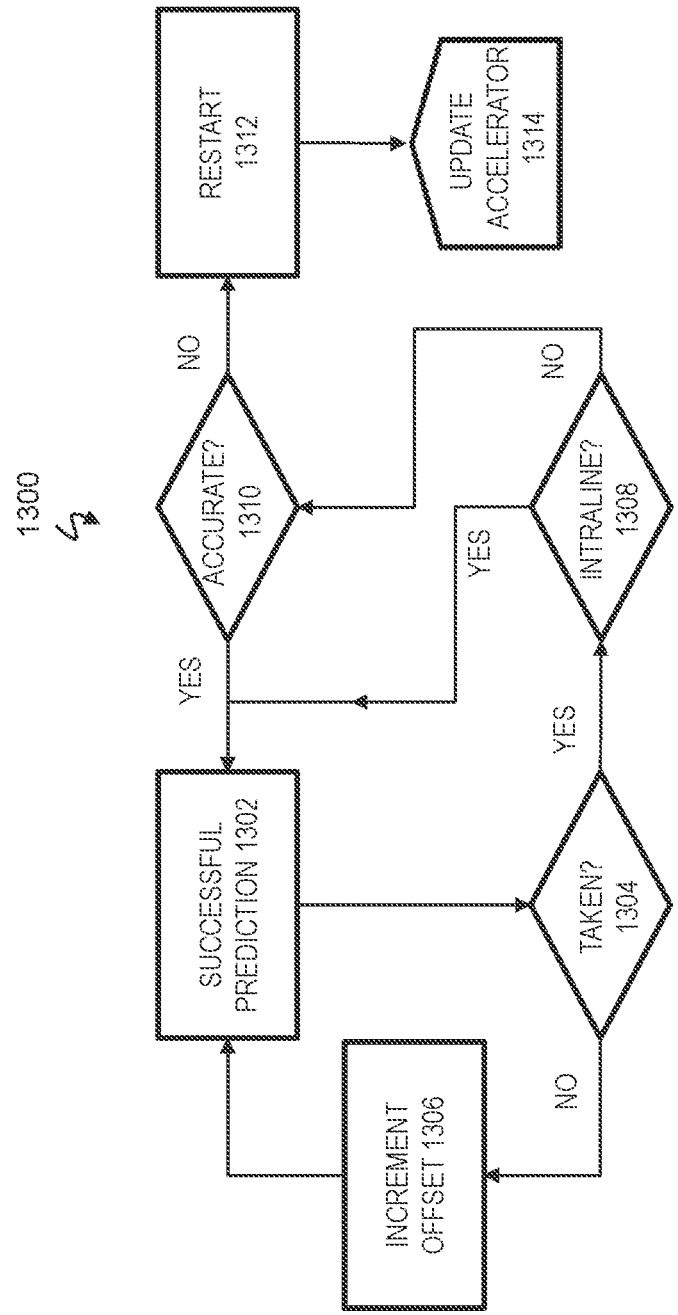
FIG. 13 is flowchart of an accelerator flow for writing to a line index accelerator in accordance with one or more embodiments of the present invention.

To illustrate details of line index accelerator 202 in metadata predictor 200, FIG. 13 is flowchart of an accelerator flow 1300 for writing to line index accelerator 202 according to one or more embodiments. Line index accelerator 202 can include and/or utilize accelerator logic 222 to perform accelerator flow 1300 as well as accelerator flow 1400 discussed below in FIG. 14.

At block 1302 of accelerator flow 1300, line index accelerator 202 is configured to receive a successful prediction. The successful prediction can be received as output from prediction pipeline 554 and/or from instruction execution pipeline 250. The successful prediction can be for an instruction address having a branch, which could be taken or not taken. At block 1304, line index accelerator 202 is configured to check whether the branch was taken or not taken. If ("No") the branch was not taken, line index accelerator 202 is configured to increment the offset at block 1306, and flow returns to block 1302. Nothing is written to line index accelerator 202. Incrementing the offset refers to processing the next line of metadata that is prepared to be stored in the line index accelerator because the line index accelerator did not find a taken branch. If "Yes" the branch was taken, line index accelerator 202 is configured to check if the branch taken was intraline at block 1308. As noted herein, intraline refers to the target address being on the same line of metadata as the instruction address being searched (i.e., the entry instruction address and target address are on the same line of metadata). If "Yes" the target address for the branch taken is intraline, line index accelerator 202 is configured to return to block 1302, and nothing is written to line index accelerator 202. On the other hand, if ("No") the target address for the branch taken is not intraline, line index accelerator 202 is configured to check if the target address for the branch taken is accurate at block 1310. If "Yes" the target address is accurate, flow proceeds to block 1302, and nothing is written to line index accelerator 202. In other words, the next line needed for the target address is already in the index pipeline 552 and prediction pipeline 554. If ("No") the target address for the branch taken is not accurate, line index accelerator 202 is configured to restart the line index accelerator 202 at block 1312, and update line index accelerator 202 at block 1314. Updating line index accelerator 202 can include adding the correct target address for the branch taken such that the correct target address will be available for the branch taken. Also, updating line index accelerator 202 can include updating the branch offset and any tag information used to determine a hit.

Figure 14:
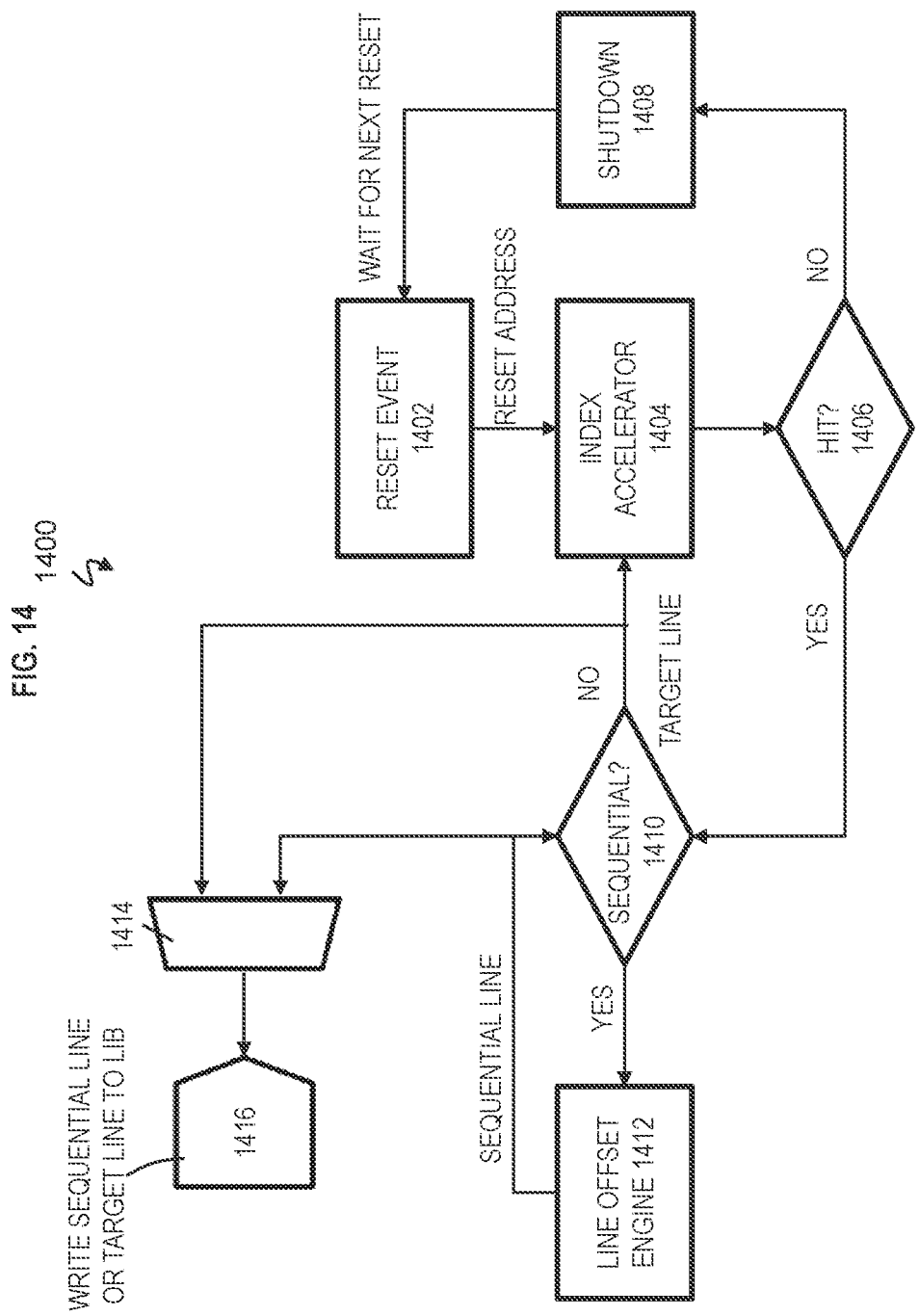
FIG. 14 is flowchart of an accelerator flow for reading a line index accelerator in accordance with one or more embodiments of the present invention.

FIG. 14 is flowchart of an accelerator flow 1400 for reading out line index accelerator 202 to LIB 204 according to one or more embodiments. Line index accelerator 202 can include and/or utilize accelerator logic 222 to perform accelerator flow 1400. At block 1402 of accelerator flow 1400, line index accelerator 202 is configured to receive a reset event, which has an instruction address as the reset address. An example reset event can be a branch wrong. At block 1404, line index accelerator 202 is configured to use the reset address to index (e.g., query) line index accelerator 202. At block 1406, line index accelerator 202 is configured to check whether the reset address is a hit in line index accelerator 202. If ("No") there is no hit from the instruction address (i.e., the reset address), line index accelerator 202 is configured to shut down line index accelerator 202 and wait from the next reset address at block 1408. If "Yes" there is a hit from the instruction address (i.e., the reset address), line index accelerator 202 is configured to check if the line read out from line index accelerator 202 needs a sequential line at block 1410. If ("No") the line read out from line index accelerator 202 does not need a sequential line, line index accelerator 202 is configured to multiplex the line (i.e., the target line) that was read out at block 1414 such that the line is written to LIB 204 at block 1416. Also, flow returns to block 1404 such that the line (i.e., the target line) that was read out is used to query/index line index accelerator 202 for the next exit branch.

If "Yes" the line read out from line index accelerator 202 needs a sequential line, line index accelerator 202 is configured to perform line offset in order to output the sequential line at block 1412. At block 1414, line index accelerator 202 is configured to multiplex the sequential line to LIB 204 and write the sequential line to LIB 204 at block 1416. For example, if the line read out from line index accelerator 202 is line X, line index accelerator 202 is configured to perform line offset to obtain line X+1, where line X+1 corresponds to a subset of instruction address bits needed to search for line X+1 in BTB1 206; therefore, line index accelerator 202 causes line X+1 to be stored immediately after line X in LIB 204. Performing the line offset refers to adding a predetermined number of bits to the previous line (e.g., line X) in order create the sequential line (e.g., line X+1) which is used as the index to query the corresponding line of metadata for the sequential line in BTB1 206. Since each line of metadata in BTB1 206 is in a known format (e.g., the line of metadata is 128 B), the offset is a fixed amount to move to the next line (i.e., the sequential line). The sequential line (e.g., sequential line X+1) is fed back to block 1410; line index accelerator 202 is configured to check whether another sequential line is needed, and if so the line offset is added at block 1412, in order to generate the next sequential line such as, for example, sequential line X+2. This loop can continue for three times in one or more embodiments, resulting in sequential lines X+1, X+2, X+3 each of which is written to LIB 204. In one or more embodiments, sequential lines X+1, X+2, X+3 can be written serially to LIB 204. In one or more embodiments, sequential lines X+1, X+2, X+3 can all be written at simultaneously, for example, in parallel to LIB 204.

Figure 15:
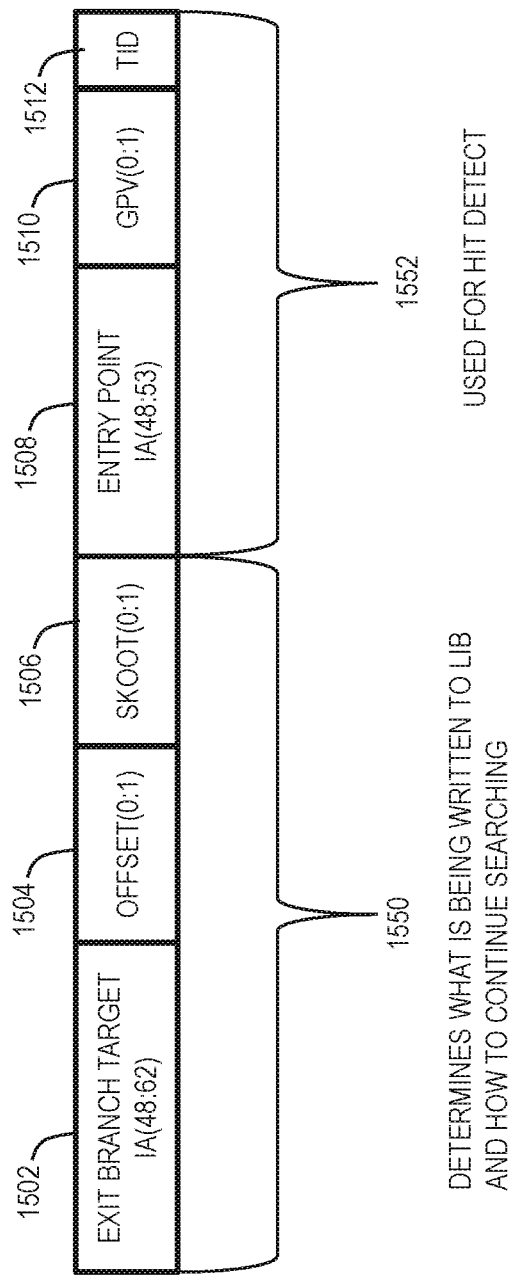
FIG. 15 depicts a block diagram of an example latency accelerator entry of a line index accelerator in accordance with one or more embodiments of the present invention.

FIG. 15 is a block diagram of an example latency accelerator entry of line index accelerator 202 in accordance with one or more embodiments. The example accelerator entry has a first part 1550 that is used to determine what is written (stored) to LIB 204 and how to continue searching line index accelerator 202. Once line index accelerator 202 no longer needs to generate sequential lines, the target of the exit branch is fed back to line index accelerator 202 to read a new line, which is the search. The first part 1550 of example accelerator entry includes the exit branch target field 1502, for example, as instruction address bit 48:62, the offset field 1504 as bits 0:1, and the SKOOT field 1506 as bits 0:1.

The second part 1552 of the example accelerator entry is used for hit detection within line index accelerator 202. The second part 1552 includes an entry point field 1508, for example, as instruction address bits 48:53, a global path vector (GPV) field 1510 as instruction address 0:1, and a transaction register (TID) field 1512.

Figure 16:
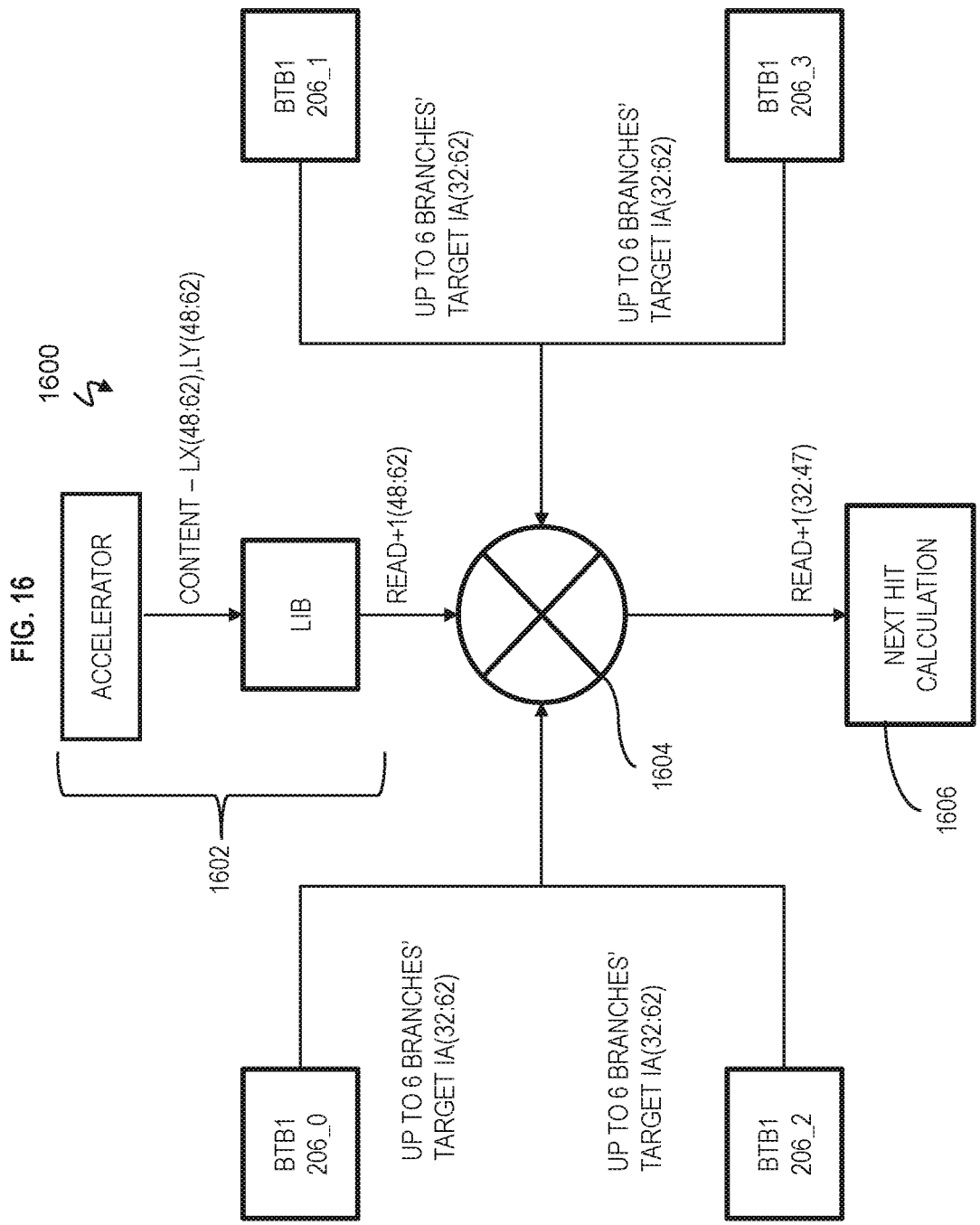
FIG. 16 is flowchart of an accelerator flow for performing payload matching in accordance with one or more embodiments of the present invention.

FIG. 16 is flowchart of an accelerator flow 1600 for performing payload matching according to one or more embodiments. Line index accelerator 202 can include and/or utilize accelerator logic 222 to perform accelerator flow 1600. Payload matching combines BTB1 data with accelerator data in order to find instruction address bits required for hit detection. At blocks 1602, 1604 of accelerator flow 1600, line index accelerator 202 is configured to index (search) LIB 204 using content, which is instruction address bits for line of metadata and sum the output. Payload matching uses the IA(48:62) of two LIB entries (which are X(48:62) and Y(48:62) in this example to find Y(32:47), where Y(32:47) is needed for the next search. While line index accelerator 202 does not need Y(32:47) to query the BTB1 during the next search, line index accelerator 202 will need Y(32:47) for hit detection, for example, in block 514 discussed herein. The tags are bits Y(32:47) of the current search line. The BTB1 contains bits 32:47 of the 128 B line that has been read out (e.g., which may be called BTB1(32: 47). In order to determine that there is a hit, Y(32:47) and BTB1(32:47) must match, otherwise, what has been read is for a different line. Payload matching looks at all of the target addresses of the current search X, in order to find Y(32:47) for the next search. The BTB1 206 can be operated in a parent-based design, where BTB1 206 is split or operated in four quadrants BTB1 206_0, BTB1 2061, BTB1 206_2, BTB1 206_3 (generally referred to as BTB1 206). After being indexed (e.g., searched), each BTB1 2060, BTB1 206_1, BTB1 206_2, BTB1 206_3 provides its output. In one or more embodiments, each BTB1 206_0, BTB1 2061, BTB1 206_2, BTB1 206_3 can output the target instruction address bit (32:62) for up to six branches.

Figure 17:
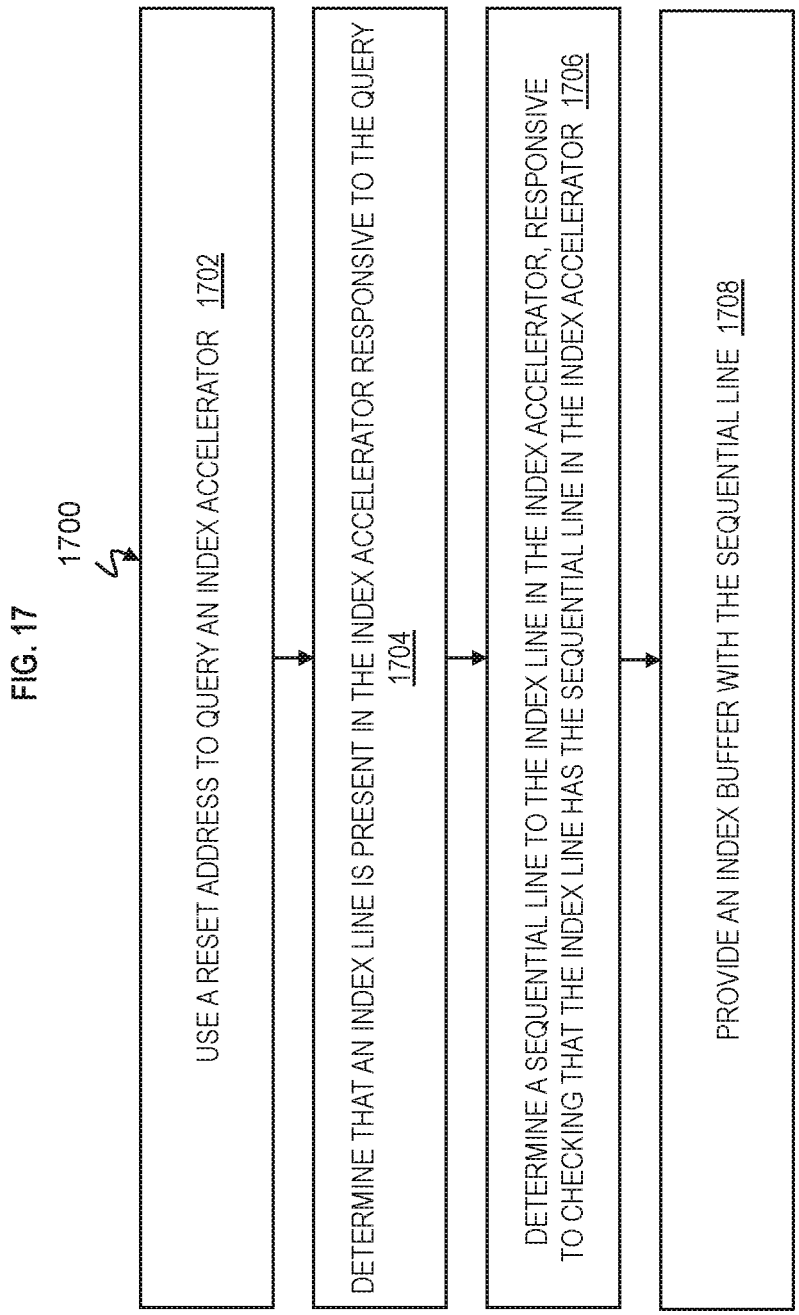
FIG. 17 is a flowchart of a computer-implemented method for using the line index accelerator to determine indices for a line index buffer in the metadata predictor in accordance with one or more embodiments of the present invention.

FIG. 17 is a flowchart of a computer-implemented method 1700 for using line index accelerator 202 to determine indices for LIB 204 in metadata predictor 200 before the indices are needed to read out BTB1 206 to LOB 208 in accordance with one or more embodiments of the invention. Computer-implemented method 1700 may be performed using computer system 100 in FIG. 1. Processors 101 in FIG. 1 along with or any other processor discussed herein can include and/or implement functions of metadata predictor 200 discussed herein. As noted herein, functions of processor 101 can be used and/or implemented in hardware components of hardware and software layer 60 depicted in FIG. 17.

At block 1702 of computer-implemented method 1700, metadata predictor 200 is configured to use a reset address to query an index accelerator (e.g., line index accelerator 202). At block 1704, metadata predictor 200 is configured to determine that an index line (e.g., line X) is present in the index accelerator (e.g., line index accelerator 202) responsive to the query. At block 1706, metadata predictor 200 is configured to determine a sequential line to the index line in the index accelerator (e.g., line index accelerator 202), responsive to checking that the index line has the sequential line in the index accelerator. For example, line index accelerator 202 is configured to check that it contains a sequential line, for example, sequential line X+1, to the index line (e.g., line X). At block 1708, metadata predictor 200 is configured to provide (write) an index buffer with the sequential line.

The index accelerator is configured to determine one or more other sequential lines (e.g., sequential lines X+2, X+3) based on the index line (e.g., line X). The index accelerator (e.g., line index accelerator 202) is configured to provide the index buffer with the sequential line and the one or more other sequential lines in advance of the sequential line and the one or more other sequential lines being required by a prediction pipeline (e.g., prediction pipeline 554 and/or instruction execution pipeline 250). The index line includes an exit target instruction address of a branch for a given entry instruction address.

There are many technical benefits and technical solutions by using a processor having a line index accelerator in accordance with one or more embodiments. The line index accelerator keeps the index pipeline ahead of prediction pipeline, which means that the LIB has and uses indices to read out the BTB1 to the LOB before output from the LOB is needed to generate a prediction. For example, the line index accelerator reduces prediction latency from 4 cycles to 2 cycles once primed in one or more embodiments. Also, the line index accelerator causes delays in the index pipeline to have less impact on prediction latency because the index pipeline can read ahead, as a result of the indices provided in advance by the index accelerator to the LIB. As more technical benefits and solutions, the line index accelerator is configured to ignore (and/or not take into account) intraline branches, thereby allowing the prediction pipeline to exploit the metadata prediction cache (e.g., LOB) without influencing the index pipeline; this effectively makes the capacity of the latency accelerator larger. One or more embodiments using the line index accelerator allow for set associativity, such that multiple useful exit branches can be saved at the same index. As additional technical benefits and solutions, one or more embodiments limit the number of address bits (e.g., to be stored in the line index accelerator) needed to traverse branch predictions through code, by leveraging performing a BTB1 read to find remaining instruction address bits during payload matching. This allows for use of small line index accelerator and LIB arrays.

FIG. 18 is a block diagram of a system 1800 for metadata predictor 200 according to embodiments of the invention. The system 1800 includes processing circuitry 1810 used to generate the design 1830 (which includes metadata predictor 200) that is ultimately fabricated into an integrated circuit 1820. The steps involved in the fabrication of the integrated circuit 1820 are well-known and briefly described herein. Once the physical layout 1840 is finalized, based, in part, on the metadata predictor 200 according to embodiments of the invention to facilitate optimization of the routing plan, the finalized physical layout 1840 is provided to a foundry. Masks are generated for each layer of the integrated circuit based on the finalized physical layout. Then, the wafer is processed in the sequence of the mask order. The processing includes photolithography and etch. This is further discussed with reference to FIG. 19.

Figure 19:
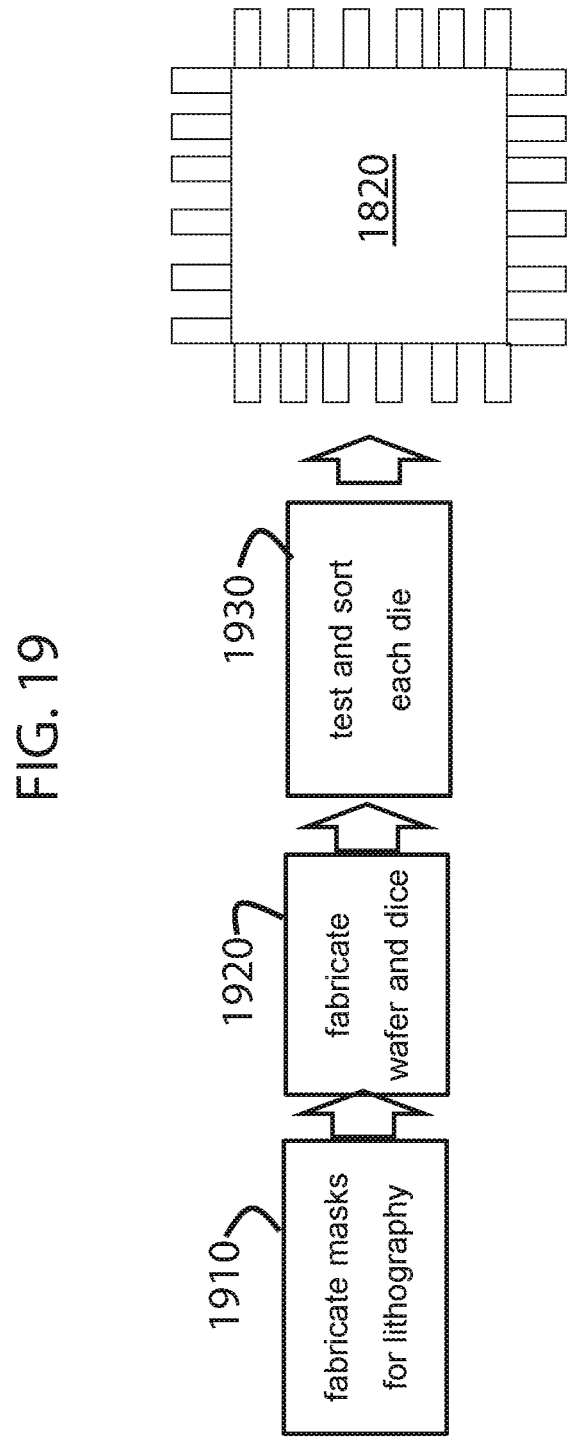
FIG. 19 is a process flow of a method of fabricating the integrated circuit of FIG. 18 in accordance with one or more embodiments of the present invention.

FIG. 19 is a process flow of a method of fabricating the integrated circuit according to exemplary embodiments of the invention. Once the physical design data is obtained, based, in part, on the metadata predictor 200, the integrated circuit 120 can be fabricated according to known processes that are generally described with reference to FIG. 19. Generally, a wafer with multiple copies of the final design is fabricated and cut (i.e., diced) such that each die is one copy of the integrated circuit 1820. At block 1910, the processes include fabricating masks for lithography based on the finalized physical layout. At block 1920, fabricating the wafer includes using the masks to perform photolithography and etching. Once the wafer is diced, testing and sorting each die is performed, at block 1930, to filter out any faulty die.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 20:
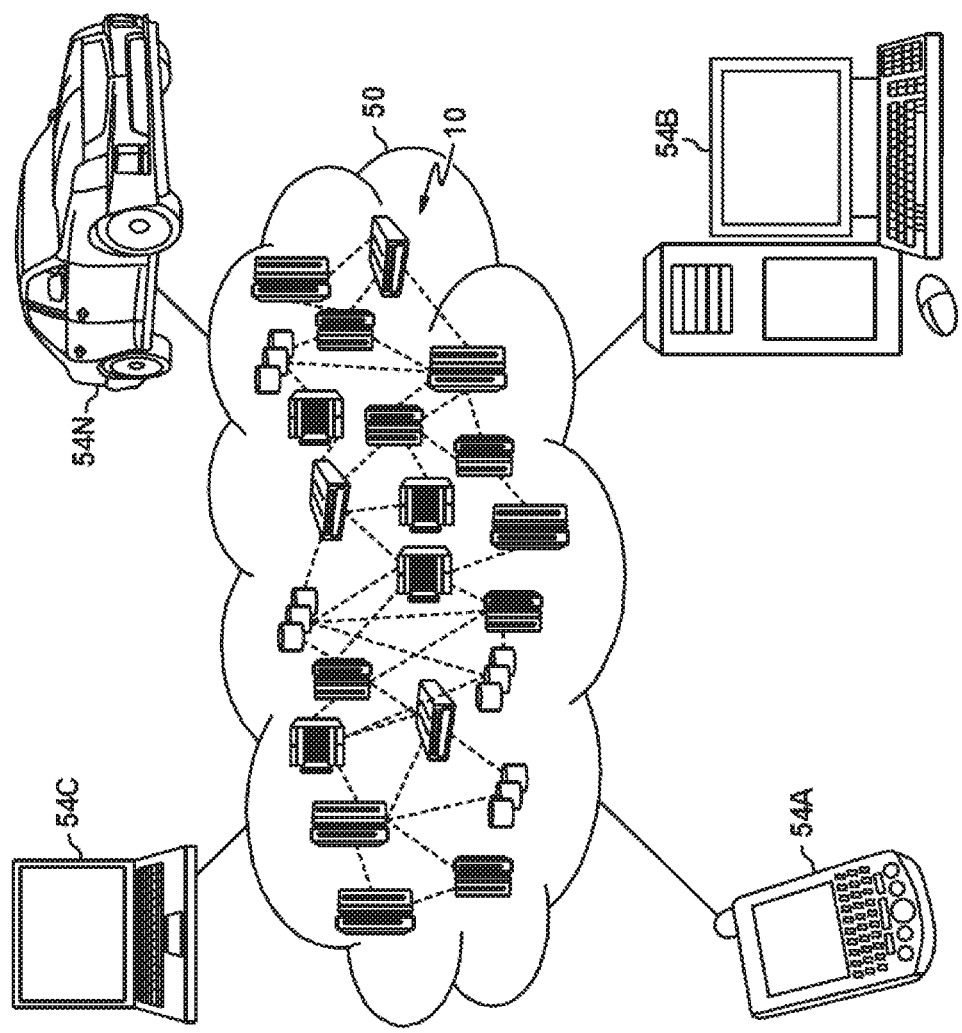
FIG. 20 depicts a cloud computing environment according to one or more embodiments of the present invention.

Referring now to FIG. 20, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 20 are intended to be illustrative only and that computing nodes 10 and cloud computing environment 50 can communicate with any type of computerized device over any type of network and/or network addressable connection (e.g., using a web browser).

Figure 21:
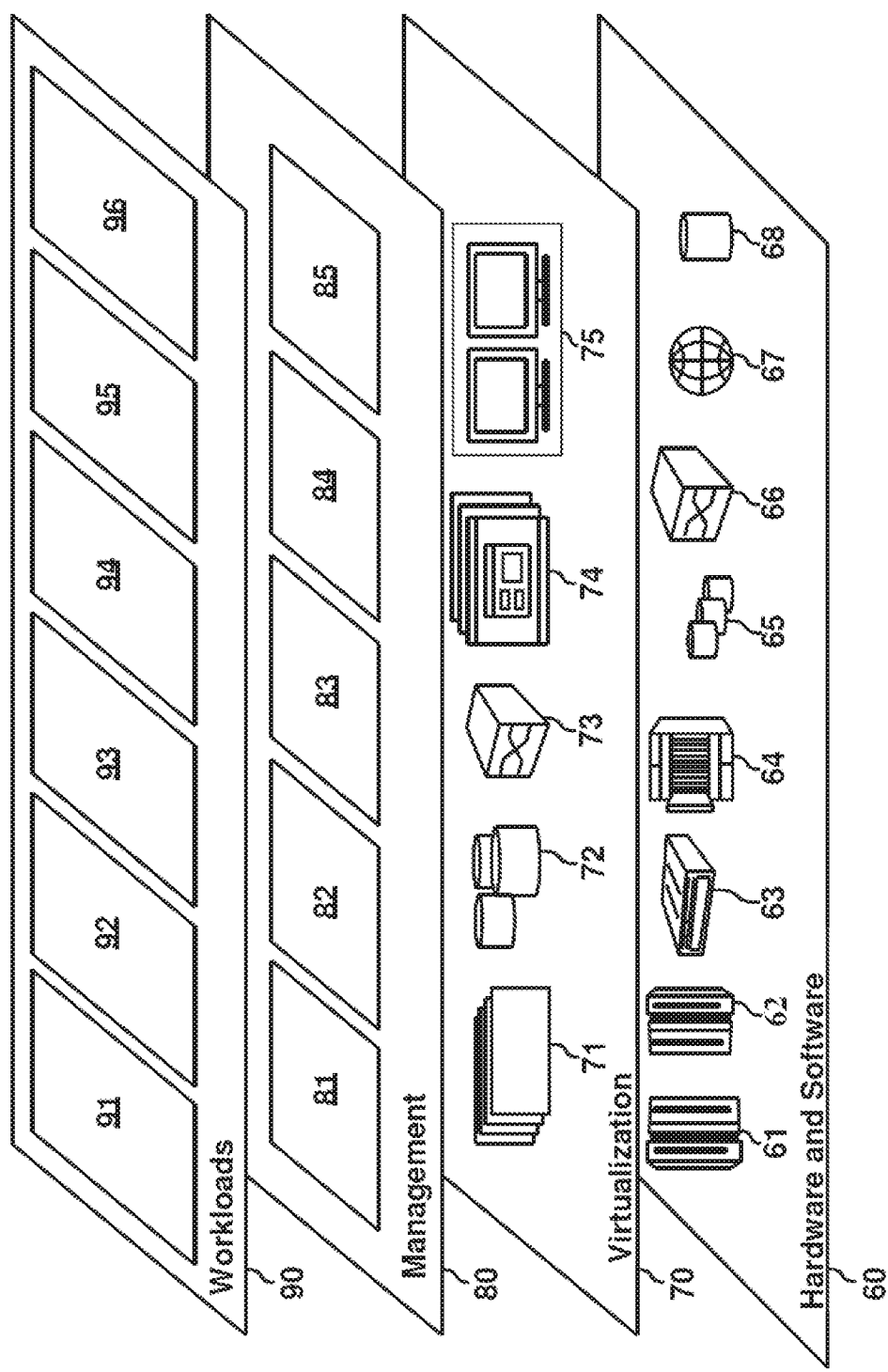
FIG. 21 depicts abstraction model layers according to one or more embodiments of the present invention.

Referring now to FIG. 21, a set of functional abstraction layers provided by cloud computing environment 50 (FIG. 20) is shown. It should be understood in advance that the components, layers, and functions shown in FIG. 31 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
determining, by a metadata predictor, a hit in a second-level structure, the hit being associated with a line of metadata in the second-level structure;
responsive to determining that a victim line of metadata in a first-level structure meets at least one condition, storing, by the metadata predictor, the victim line of metadata in the second-level structure; and
storing, by the metadata predictor, the line of metadata from the second-level structure in the first-level structure to be utilized to facilitate performance of a processor, the line of metadata from the second-level structure comprising entries for a plurality of instructions, wherein the metadata predictor runs asynchronously to a prediction pipeline of the processor.

2. The computer-implemented method of claim 1, wherein the at least one condition comprises an indication that the victim line of metadata has been updated.

3. The computer-implemented method of claim 1, wherein the at least one condition comprises an indication that the victim line of metadata is absent from the second-level structure.

4. The computer-implemented method of claim 1, wherein the determining the hit in the second-level structure is performed responsive to determining that the line of metadata is a miss in the first-level structure.

5. The computer-implemented method of claim 1, wherein the line of metadata from the second-level structure is provided to a prediction pipeline to make metadata predictions.

6. The computer-implemented method of claim 1, wherein:
the second-level structure is configured to be searched for a preload line of metadata associated with a preload victim line of metadata, the first-level structure being searched to provide the preload victim line of metadata;
the preload line of metadata is written into the first-level structure; and
the preload line of metadata is provided to a prediction pipeline, responsive to being requested.

7. The computer-implemented method of claim 1, wherein a prediction pipeline is stalled until the second-level structure makes a determination about whether there is the hit, the prediction pipeline being configured to resume responsive to the determination and configured to use the line of metadata associated with the hit.

8. The computer-implemented method of claim 1, wherein the first-level structure a first branch target buffer and the second-level structure is a second branch target buffer coupled to the first branch target buffer.

9. The computer-implemented method of claim 1, wherein a line index buffer is coupled to the first branch target buffer, the line index buffer being populated from restarts.

10. The computer-implemented method of claim 1, wherein second branch target buffer indexing logic is coupled to the second branch target buffer, the second branch target buffer indexing logic being populated from restarts.

11. A system comprising:
a metadata predictor configured to perform operations comprising:
determining a hit in a second-level structure, the hit being associated with a line of metadata in the second-level structure;
responsive to determining that a victim line of metadata in a first-level structure meets at least one condition, storing the victim line of metadata in the second-level structure; and
storing the line of metadata from the second-level structure in the first-level structure to be utilized to facilitate performance of one or more processors, the line of metadata from the second-level structure comprising entries for a plurality of instructions, wherein the metadata predictor runs asynchronously to a prediction pipeline of the one or more processors.

12. The system of claim 11, wherein the at least one condition comprises an indication that the victim line of metadata has been updated.

13. The system of claim 11, wherein the at least one condition comprises an indication that the victim line of metadata is absent from the second-level structure.

14. The system of claim 11, wherein the determining the hit in the second-level structure is performed responsive to determining that the line of metadata is a miss in the first-level structure.

15. The system of claim 11, wherein the line of metadata from the second-level structure is provided to a prediction pipeline to make metadata predictions.

16. The system of claim 11, wherein:
the second-level structure is configured to be searched for a preload line of metadata associated with a preload victim line of metadata, the first-level structure being searched to provide the preload victim line of metadata;
the preload line of metadata is written into the first-level structure; and
the preload line of metadata is provided to a prediction pipeline, responsive to being requested.

17. The system of claim 11, wherein a prediction pipeline is stalled until the second-level structure makes a determination about whether there is the hit, the prediction pipeline being configured to resume responsive to the determination and configured to use the line of metadata associated with the hit.

* * * * *